(12) United States Patent
Yanase

(10) Patent No.: US 12,061,327 B2
(45) Date of Patent: Aug. 13, 2024

(54) WHITE LIGHT INTERFERENCE MICROSCOPE

(71) Applicant: Keyence Corporation, Osaka (JP)

(72) Inventor: Kengo Yanase, Osaka (JP)

(73) Assignee: KEYENCE CORPORATION, Osaka (JP)

(*) Notice: Subject to any disclaimer, the term of this patent is extended or adjusted under 35 U.S.C. 154(b) by 609 days.

(21) Appl. No.: 17/368,952

(22) Filed: Jul. 7, 2021

(65) Prior Publication Data

US 2022/0043247 A1 Feb. 10, 2022

(30) Foreign Application Priority Data

Aug. 7, 2020 (JP) ................. 2020-135357

(51) Int. Cl.
*G02B 21/00* (2006.01)
*G01B 9/0209* (2022.01)
*G02B 9/02* (2006.01)
*G02B 21/36* (2006.01)

(52) U.S. Cl.
CPC ....... *G02B 21/0056* (2013.01); *G01B 9/0209* (2013.01); *G02B 21/361* (2013.01)

(58) Field of Classification Search
CPC .............. G02B 21/0056; G02B 21/361; G02B 6/4221; G02B 7/00; G02B 19/00; G02B 21/00; G01B 9/0209
USPC ....................................................... 359/368
See application file for complete search history.

(56) References Cited

U.S. PATENT DOCUMENTS

| 8,994,808 | B2 | 3/2015 | Okamoto et al. |
| 9,140,887 | B2* | 9/2015 | Karube ................ G02B 21/244 |
| 10,539,775 | B2 | 1/2020 | Tanaka et al. |
| 10,816,783 | B2 | 10/2020 | Yamashita et al. |
| 2002/0075563 | A1* | 6/2002 | Aizaki ................ G02B 21/361 |
| | | | 359/368 |

FOREIGN PATENT DOCUMENTS

| JP | 2008286879 A | * | 11/2008 |
| JP | 2018146496 A | * | 9/2018 |
| JP | 2018146496 A | | 9/2018 |

* cited by examiner

*Primary Examiner* — Stephone B Allen
*Assistant Examiner* — Leonidas Boutsikaris
(74) *Attorney, Agent, or Firm* — Kilyk & Bowersox, P.L.L.C.

(57) ABSTRACT

A white light interference microscope includes an imaging part taking interference images, a laser light source, a light receiving part receiving reflected light of laser beam from a sample via a confocal optical system and generating a light reception signal corresponding to the light receiving intensity of the reflected light, a focal calculation part calculating a focal position matching a focus of the objective lens with a surface of the sample based on the light reception signal at each height position of the stage or the objective lens, a focus adjustment part adjusting the height position of the stage or the objective lens to match with the focal position, and a first measuring part measuring the surface shape of the sample based on a plurality of interference images taken by the imaging part at a plurality of height positions defined within a height range including the focal position.

13 Claims, 24 Drawing Sheets

FIG. 7A

| STEPS | USE PRINCIPLE | Z-PITCH | LASER SCANNING RANGE |
|---|---|---|---|
| AUTOFOCUS | LASER CONFOCAL METHOD | WIDE (THE FIRST PITCH) | NARROW (ONE-DIMENSION) |
| BRIGHTNESS SETTING | WHITE LIGHT INTERFEROMETRY | CONSTANT (THE SECOND PITCH) | — |
| MEASUREMENT RANGE SETTING | WHITE LIGHT INTERFERENCE OR LASER CONFOCAL METHOD | WIDE (THE THIRD PITCH) | WIDE (TWO-DIMENSION) |
| SURFACE SHAPE MEASUREMENT | WHITE LIGHT INTERFERENCE OR LASER CONFOCAL METHOD | NARROW (THE FOURTH PITCH) | WIDE (TWO-DIMENSION) |

WHITE LIGHT INTERFERENCE MICROSCOPE

CROSS-REFERENCE TO RELATED APPLICATIONS

The present application claims foreign priority based on Japanese Patent Application No. 2020-135357, filed Aug. 7, 2020, the contents of which are incorporated herein by reference.

BACKGROUND OF THE INVENTION

Field of the Invention

The present invention relates to a white light interference microscope.

Description of the Related Art

For example, in Japanese patent application publication No. 2018-146496, a shape measurement device using a principle of white light interference is disclosed. Specifically, the shape measurement device disclosed in Japanese patent application publication No. 2018-146496 is provided with an interference part splitting white light into measurement light and reference light and generating interference light in which the split lights are overlapped each other, and a surface shape acquiring part acquiring surface shape data of a measuring object based on the interference fringes caused by the interference light.

Further, the shape measurement device according to Japanese patent application publication No. 2018-146496 is configured to detect a Z-coordinate value in advance when the curve line, which indicates luminance of the interference fringes, indicates a maximum value by moving the interference part in the Z direction before performing a surface shape measurement.

With this configuration, in advance, by searching the Z-coordinate value indicating that the luminance of the interference fringes becomes maximum, the interference part can appropriately focus on the surface of the measuring object.

SUMMARY OF THE INVENTION

Note that when using the principle of white light interference, the reference light becomes flare components (see background components Ib in FIG. 6A), so that the light receiving amount of the interference light, that is, the luminance of the interference fringes becomes relatively large value even when it is in a state deviated from a focal position.

On the other hand, when the reflection factor of the measuring object is low, the light receiving intensity of the reflected light from the measuring object becomes small, so that the variation amount of the light receiving amount corresponding to brightness and darkness of the interference fringes (see difference |Ip−Ib| between Ip and Ib in FIG. 6A) becomes relatively small in comparison with the light receiving amount of the flare components. In this case, when using the configuration described in Japanese patent application publication No. 2018-146496, in order to precisely perform the autofocus, for example, it is required to enhance a signal intensity by increasing the gain of the photodetector. However, when using the principle of white light interference, as descried above, the light receiving amount of the flare components is relatively large, so that the signal intensity is saturated according to the increase of the gain, and the present inventor has realized that there may be a possibility that the signal corresponding to the brightness and darkness of the interference fringes (see the aforementioned |Ip−Ib|) cannot be accurately detected.

In order to correspond to such problems, a method of, after focusing to some extent, performing an autofocus while adjusting the gain of the photodetector may be considered. However, it requires labor and takes time and it is not easy. Therefore, there is still room for the improvement in the usability.

The presently disclosed technology was made in consideration of the aforementioned circumstances. An object is to improve usability when performing focusing in a white light interference microscope.

In the first aspect of the present disclosure, a white light interference microscope includes a stage placing a measuring object; a white light source irradiating white light to the measuring object placed on the stage via an objective lens; a branching optical system branching the white light irradiated from the white light source into a reference light directed to a predetermined reference surface, and a measurement light directed toward the measuring object; an imaging part taking an interference image by receiving the reference light reflected by the reference surface and the measurement light reflected by the measuring object; and a measuring part measuring a surface shape of the measuring object based on the interference image.

And, according to the first aspect of the present disclosure, the white light interference microscope includes a laser light source irradiating a laser beam directed to the measuring object via the same object lens or a different object lens; a light receiving part receiving a reflected light of the laser beam from the measuring object via a confocal optical system including the objective lens, and generating a light reception signal according to a light receiving intensity of the reflected light; and a driving part changing a relative height position of the stage with respect to the objective lens. Further, the white light interference microscope includes a calculation part calculating a focal position matching a focus of the objective lens with a surface of the measuring object based on the light reception signal generated by the light receiving part at each height position of the stage or the objective lens, and a focus adjustment part matching the height position with the focal position calculated by the calculation part by adjusting the height position of the stage or the objective lens by operating the driving part. The measuring part measures the surface shape of the measuring object based on the plurality of interference images taken by the imaging part at the plurality of positions defined within the height range including the focal position.

According to the first aspect, the white light interference microscope can measure the surface shape based on the principle of the white light interference (white light interferometry) by taking the interference images reflecting the interference between the measurement light and the reference light.

Here, in order to precisely measure the surface shape, it is required that the focal position which is the focused position of the interference objective lens, etc. is searched in advance, but the conventional well-known method remains room for improvement in the usability.

Thus, the white light interference microscope according to the first aspect uses the principle of the confocus by the laser beam (laser confocal method), not the white light interferometry, when searching the focal position.

In the case in which the laser beam confocal method is used, the light receiving intensity which is relatively high at the focal position is realized, and on the other hand, at out of the focal position, the light receiving intensity is significantly reduced. With this, without starting the search from the state of being focused to some extent, the gain of the photodetector can be sufficiently enhanced. As a result, it becomes advantage from the point of view of requiring labor and taking time, etc., and it is possible to improve the usability when focusing.

Note that the disclosure "irradiating a laser beam directed to the measuring object via the same object lens or a different object lens" means that the laser beam may be irradiated by using the interference objective lens for the white light interferometry as the objective lens when searching the focal position by using the laser confocal method, or the laser beam may be irradiated after changing to an objective lens which is different from the interference objective lens. Further, the objective lens and the branching optical system may be integrally configured, or in order to move the branching optical system if necessary, the objective lens and the branching optical system may be separately configured.

That is, the present disclosure does not exclude the configuration in which the objective lens facing the measuring object is temporarily switched when the focal position is searched by using the laser confocal method, and when the interference images are taken by using the white light.

Further, according to the second aspect of the present disclosure, the white light interference microscope includes the laser beam scanning part scanning the laser beam irradiated from the laser light source on the surface of the measuring object; a scanning control part operating the laser beam scanning part; and the second measuring part measuring the surface shape of the measuring object based on the light receiving intensity of the reflected light of the laser beam scanned by controlling the laser beam scanning part by the scanning control part. The laser beam scanning part is operated at each height position of the stage, so that the scanning control part scans the laser beam when calculating the focal position by the calculation part. In the case in which the calculation part calculates the focal position, the scanning range of the laser beam by the laser beam scanning part is set narrower than the case in which the second measuring part measures the surface shape.

According to the second aspect, when the focal position is searched by using the laser confocal method, the white light interference microscope scans the laser beam in a range narrower than the case in which the surface shape is measured by using the laser confocal method. Since the scanning range is narrowed, the focal position can be searched in high speed.

Further, according to the third aspect, the laser beam scanning part scans the laser beam along at least one of the predetermined first direction and the second direction which is perpendicular to the first direction. In the case in which the calculation part calculates the focal position, in the scanning range of the laser beam by the laser beam scanning part, the dimension in one of the first and second directions may be set shorter than the case in which the second measuring part measures the surface shape.

According to the third aspect, in the case in which the focal position is searched by using the laser confocal method, the laser beam is scanned in, for example, one-dimensional line. With this, the focal position can be searched in high speed.

Further, according to the fourth aspect, in the case in which the calculation part calculates the focal position, the distance of the height positions each other when the relative height position of the stage is changed may be set wider than the case in which the measuring part measures the surface shape of the measuring object.

Generally, when the relative height position of the stage is changed, the light receiving intensity obtained through the laser confocal method is moderately changed in comparison with the change of the light receiving intensity obtained through the white light interferometry (particularly, the relative size of the light receiving intensity caused by the interference fringes with respect to the light receiving intensity caused by the flare component). In other words, the peak width of the light receiving intensity obtained through the laser confocal method becomes relatively wider than the peak width according to the white light interferometry. Further, the peak number of the light receiving intensity obtained through the laser confocal method is generally one, and it is fewer than the peak number according to the white light interferometry.

Therefore, in the case in which the focal position is searched by using the laser confocal method, it is permitted that the distance of the height positions each other (a pitch in the height direction) used for the search, the measurement, etc. is made wider than the case in which the surface shape is measured by using the white light interferometry.

According to the fourth aspect, in the case in which the focal position is searched by using the laser confocal method, the pitch of the height direction is relatively coarsely (widely) set in comparison with the case in which the surface shape is measured by using the white light interferometry. By setting in such way, the focal position can be searched in high speed.

According to the fifth aspect, the white light interference microscope includes a measurement range setting part setting the height range based on the interference images taken by the imaging part after the focal position is calculated by the calculation part, and the measurement range setting part generates the interference images via the imaging part in the state in which the relative height position of the stage is changed from the starting position with the focal position as a reference and calculates the peak position of the interference fringes from the interference images generated in each height position, and the height range may be set in a range above the predetermined first threshold which is the pixel number successfully calculating the peak position.

According to the fifth aspect, by using the white light interferometry, the measurement range setting part sets a height range used for the measurement of the surface shape. Even when the interference fringes are found out from the interference image, when the peak position of the interference fringes occupies very small part within the screen, it is considered that it is inconvenient to perform the measurement by the white light interferometry. Thus, as the fifth aspect, by performing the setting based on the pixel number successfully calculating the peak position of the interference fringes, the height range can be set more appropriately.

Further, to begin with, as the fifth aspect, it is configured to set the height range after the focal position was searched, so that the height range including the focal position can be set precisely and in high speed. This is extremely effective, so that various settings of the height range, etc. are smoothly performed.

Further, as the fifth aspect, the setting of the height range starts from the starting position with the focal position as a reference, so that the height range can be set in the state of being focused to some extent. Accordingly, the height range can be set in high speed.

Further, according to the sixth aspect of the present disclosure, the white light interference microscope includes a measurement range setting part setting the height range based on the light reception signal generated by the light receiving part after the focal position was calculated by the calculation part, and the measurement range setting part generates images based on the light reception signal in the state in which the relative height position of the stage is changed from the starting position with the focal position as a reference, and the measurement range setting part generates pixel data corresponding to the light reception signal generated in the light receiving part for the plurality of pixels in the images generated at each height position, and the measurement range setting part may set the height range as a range in which all values of the plurality of pixel data is below the predetermined second threshold.

Here, the term "pixel data" means a digital signal obtained by A/D converting the output signal (light reception signal) of the light receiving part. The pixel data can be outputted as the digital signal corresponding to each pixel.

According to the sixth aspect, the second measurement range setting part sets the height range used for the measurement of the surface shape by using the laser confocal method. When the pixel data value (particularly, peak value) is extremely large, it is concerned that that the pixel data may be saturated. Thus, by performing the setting based on the pixel data as the sixth aspect, more appropriate height range can be determined.

Further, to begin with, as the sixth aspect, it is configured to set the height range after the focal position was searched, so that the height range including the focal position can be set precisely and in high speed. This is extremely effective, so that various settings of the height range, etc. are smoothly performed.

Further, as the sixth aspect, the setting of the height range starts from the starting position with the focal position as a reference, so that the height range can be set in the state of being focused to some extent. Accordingly, the height range can be set in high speed.

Further, as the seventh aspect, in the case in which the measurement range setting part sets the height range, the distance of the height positions each other when the relative height position of the stage is changed may be set wider than the case in which the measuring part measures the surface shape of the measuring object.

When the height range is set, it is not necessary to precisely analyze the interference image in comparison with the case in which the surface shape is measured by using the white light interferometry. Therefore, it is permitted to make a wider distance (a pitch in the height direction) of the height positions each other used for the search, the measurement, etc.

According to the seventh aspect, in the case in which the height range is set, the pitch in the height direction is relatively coarsely (widely) set in comparison with the case in which the surface shape is measured by using the white light interferometry. By setting in such way, the height range can be set in high speed.

Further, according to the eighth aspect of the present disclosure, the measurement range setting part may set the focal position as the starting position.

The eighth aspect is effective for appropriately setting the height range.

Further, as the ninth aspect of the present disclosure, the height range is set as the range partitioned by an upper limit position set to be more than the focal position, and at a lower limit position set to be less than the focal position, and the measurement range setting part may set the upper limit position after the lower limit position was set.

The eighth aspect is effective for appropriately setting the height range.

Further, as the tenth aspect of the present disclosure, the measurement range setting part divides the distance between the upper limit position and the lower limit position in an equal interval in the state in which the upper limit position and the lower limit position are set, and may set each height position of the stage when the measuring part measures the surface shape of the measuring object.

According to the tenth aspect, the pitch width used for the measurement of the surface shape can be set in high speed. This is extremely effective, so that various settings are smoothly performed.

Further, as the eleventh aspect of the present disclosure, the white light interference microscope includes a brightness adjustment part adjusting the brightness of the white light source based on the interference images taken by the imaging part after the focal position was calculated by the calculation part, and the brightness adjustment part generates the interference images via the imaging part in the state in which the relative height position of the stage is changed from the starting position with the focal position as a reference, and the brightness adjustment part selects the interference image including the relatively bright pixel among the interference images generated at each height position by the imaging part, and the brightness of the white light source may be adjusted within a range in which the brightness of each pixel of the generated interference image is non-saturated.

According to the eleventh aspect, by starting the adjustment of the brightness from the starting position with the focal position as a reference, the brightness can be adjusted from the state of being focused to some extent. With this, without occurring the saturation caused by the flare components, etc., the brightness can be appropriately adjusted.

Further, the configuration according to the eleventh aspect, it is extremely effective from the point of view that the processing according to focusing by the laser confocal method, and the processing according to the shape measurement by the white light interferometry can be smoothly connected.

Further, according to the twelfth aspect, the brightness adjustment part may set the focal position as the starting position.

The twelfth aspect is effective for appropriately setting the height range.

Effects of the Invention

As discussed above, according to the present disclosure, in the white light interference microscope, the usability at the time of focusing can be improved.

BRIEF DESCRIPTION OF THE DRAWINGS

FIG. 7A is a diagram exemplifying a list of steps which can be performed by the white light interference microscope, and use principles used for the steps.

DETAILED DESCRIPTION

Hereinafter, the embodiments of the present disclosure will be described with reference to the drawings. Note that the following descriptions are examples.

<White Light Interference Microscope 1>

Figure 1:
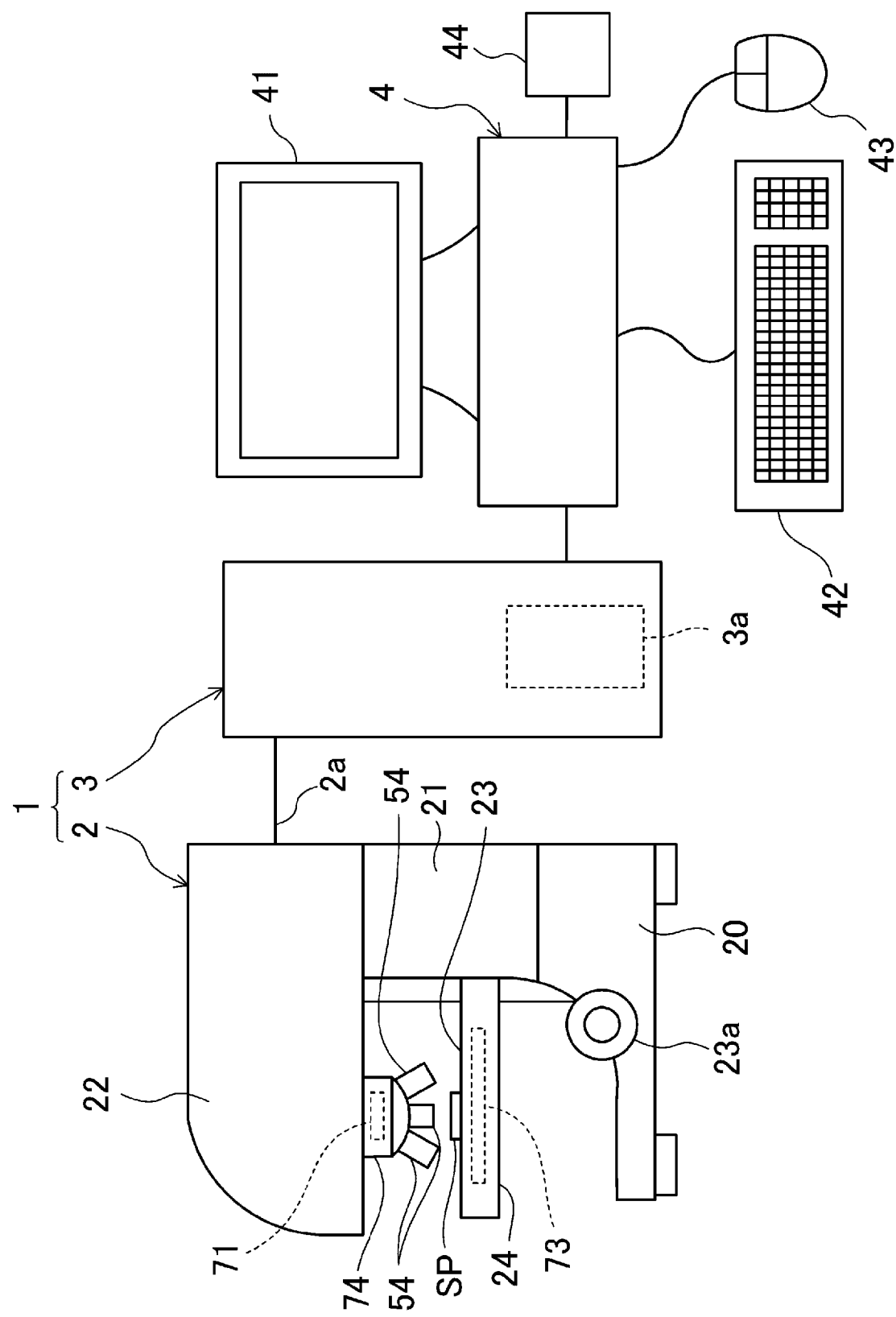
FIG. 1 is a schematic diagram exemplifying a system configuration of white light interference microscope.

FIG. 1 is a schematic diagram exemplifying a system of white light interference microscope 1 according to the embodiment of the present disclosure. The white light interference microscope 1 shown in FIG. 1 can enlarge and observe an observation object and a sample SP as a measuring object, and it is the device for measuring a surface shape (three-dimensional shape) of the sample SP.

The white light interference microscope 1 is configured as a two-beam interferometer using white light. That is, when measuring the surface shape of the sample SP, the white light interference microscope 1 can perform a white light interferometry using two-beam interference of the white light. Specifically, the white light interference microscope 1 according the present embodiment can be used for observing the sample SP by using the white light as coaxial vertical illumination.

Further, when measuring the sample SP, the white light interference microscope 1 can perform a laser confocal method by using a laser beam, and depending on the user's needs, the measurement by the white light interferometry and the measurement by the laser confocal method can be selectively used.

When paying attention to its observation function, the white light interference microscope 1 is called as a magnification observation device, or simply called as a microscope, or called as a digital microscope. On the other hand, when paying attention to its measuring function, the white light interference microscope 1 can be called as a three-dimensional shape measurement device, or called as a surface shape measurement device. Further, when paying attention to its measurement principle, the white light interference microscope 1 can be called as a white color interferometer, or called as a laser confocal microscope.

As shown in FIG. 1, the white light interference microscope 1 according to the present embodiment is provided with an observation unit 2 and an external unit 3. The observation unit 2 is provided with optical components as a unit for performing an observation and a measurement by the white light interference. On the other hand, the external unit 3 is used as a unit to realize a communication function, a power supply function, etc. Note that the external unit 3 can be integrally built in the observation unit 2. As shown in the drawing example, when the white light interference microscope 1 is configured by the observation unit 2 and the external unit 3, a power supply device 3a supplying power to the external unit 3 and the observation unit 2 can be provided. The observation unit 2 and the external unit 3 are connected by a wire 2a.

Further, an operation terminal 4 can be connected to the white light interference microscope 1. The operation terminal 4 can be connected by a communication part 3b (see FIG. 4) which is built in the external unit 3. Note that instead of the connection of the operation terminal 4 and the external unit 3, or in addition to the connection of the operation terminal 4 and the external unit 3, the operation terminal 4 and the observation unit 2 can be connected. In this case, in the observation unit 2, an equipment corresponding to the communication part 3b is built-in.

As shown in FIG. 1, the operation terminal 4 according to the present embodiment includes a display part 41, a keyboard 42, a mouse 43, and a memory device 44. The operation terminal 4 can be integrally built in the observation unit 2 or the external unit 3 as a component member of the white light interference microscope 1. In this case, the operation terminal 4 can be called as a control unit, etc., not called as "operation terminal", and in this embodiment, the case in which the control unit is separated from the observation unit 2 and the external unit 3 is exemplified.

Further, at least one of the display part 41, the keyboard 42, the mouse 43, and the memory device 44 can be integrally built in the observation unit 2, the external unit 3, etc., as a component member of the white light interference microscope 1. That is, the whole operation terminal 4 or each component element of the operation terminal 4 can be a part of the white light interference microscope 1. For example, it may be the white light interference microscope 1 built with the display part 41, or the white light interference microscope 1 built with the keyboard 42 and the mouse 43 (operation part).

The keyboard 42 and the mouse 43 are well-known as a computer control device, and these devices are used for operating the operation terminal 4. These devices receive operation inputs from the user, and by inputting signals corresponding to the operation inputs to the operation terminal 4, the white light interference microscope 1 can be operated via the operation terminal 4. Specifically, by operating the keyboard 42 and the mouse 43, various information inputs, a selection operation, an image selection operation, an area designation, a position designation, etc. can be performed.

Note that the keyboard 42 and the mouse 43 are just an example of the operation part. Instead of the keyboard 42 and the mouse 43, or in addition to the keyboard 42 and the mouse 43, for example, various devices such as a pointing device, a voice input device, a touch panel, etc. can be used.

For example, the display part 41 is configured by the liquid crystal display or the organic EL panel. The display part 41 can display information of memory contents, etc. in the memory device 44 to the user. Note that a touch panel as the operation part may be built in the display part 41.

Further, each member, means, element, unit, etc. which will be described later may be provided in any of the observation unit 2, the external unit 3, and the operation terminal 4.

In the white light interference microscope 1, other that the aforementioned equipment and devices, devices for performing various operations and controls, printer, computer, memory device, peripheral equipment, etc. for performing other various processes can be connected by a wired connection or a wireless connection.

<Whole Structure of Observation Unit 2>

Figure 2:
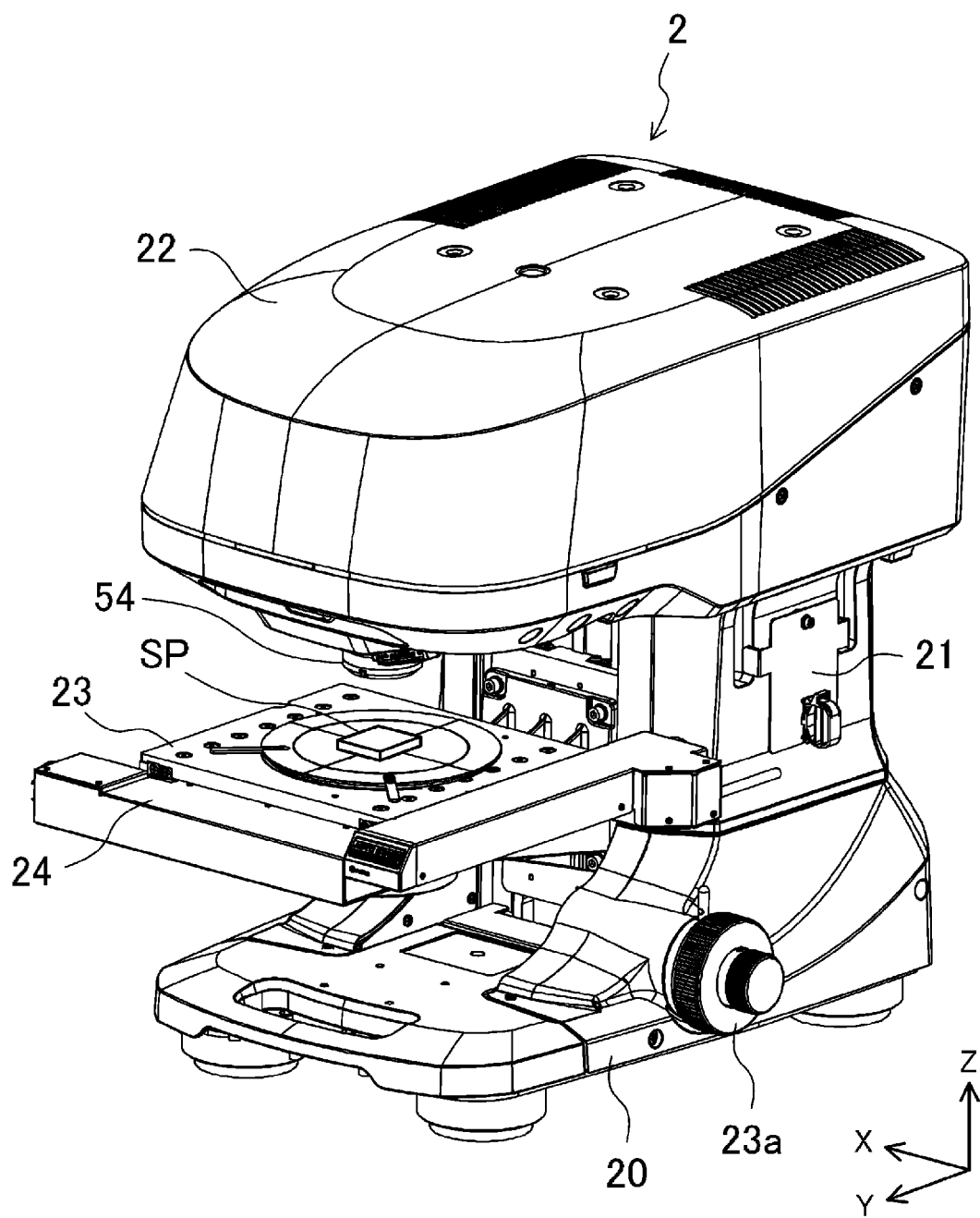
FIG. 2 is a perspective view showing an observation unit.

FIG. 2 is a perspective view showing the observation unit 2. An appearance shape of the observation unit 2 is shown in FIG. 2. The observation unit 2 is provided with a base 20 placed on a work table, etc., a support part 21 extending upwardly from the deep side part of the base 20, a head part 22 provided to the upper part of the support part 21, and a stage 23 for placing a sample SP as a measuring object.

Note that the near side of the observation unit 2 refers to one side near the user when the user faces to the observation unit 2 in a normal operation posture. On the other hand, the deep side of the observation unit 2 refers to the other aide separating from the user when the user faces to the observation unit 2 in the normal operation posture. These definitions are used for only convenience of explanation, and it is not limited to the actual use state.

In the description below, the depth direction connecting between the near side and the deep side of the observation unit 2 is called as "X-direction", and the right and left direction of the observation unit 2 (short direction of the head part 22) is called as "Y-direction". And, the direction along both the X-direction and the Y-direction is called as "horizontal direction", and the plane surface along the horizontal direction is called as "horizontal surface".

Further, the height direction of the observation unit 2 is called as "Z-direction". This Z-direction is perpendicular to both the X-direction and the Y-direction. The term "height position" in the description below refers to the position when viewed in the coordinate axis (Z-axis) along the Z-direction. There is a case that the height position may be called as "Z-position".

Needless to say, the present description is not limited to these definitions, and the definitions of the X-direction, the Y-direction, and the Z-direction, etc. can be arbitrary changed.

Among the members configuring the observation unit 2, the stage 23 is configured as an electric placing table. The stage 23 can be moved in the Z-direction by rotationally operating an elevating dial 23a shown in FIGS. 1 and 2, etc.

In addition to the members relating to the appearance shape of the observation unit 2 such as a base 20, etc., the observation unit 2 is provided with a white light optical system 5 which is the assembly of the components relating to the observation and the measurement, etc. by using white light, a laser optical system 6 which is the assembly of the components relating to the measurement, etc. by using laser beam, a unit driving system 7 driving the stage 23, etc., and an unit control system 8 performing various processes via the white light optical system 5, the laser optical system 6, and the unit driving system 7.

The white light optical system 5 is an observation optical system (non-confocal observation optical system) used as an illumination for observation or a generation source of the interference light, and is the optical system for observing a sample SP illuminated by the white light and for generating an interference image which characterizes the surface shape of the sample SP. Note that the term "optical system" described here is used in a broad sense. That is, the white light optical system 5 is defined as a total system of, in addition to the optical components such as a lens, etc., a light source, an image sensor element, etc. The laser optical system 6 is also defined in a similar manner.

The laser optical system 6 is the observation optical system (confocus observation optical system) using a so-called laser confocal method, and it is the system for generating an image (hereinafter referred to as "laser image") based on the reflected light of the laser beam by two-dimensionally scanning the laser beam, or illuminating the laser beam in a focused state.

The unit driving system 7 is provided with a Z-direction driving part 71 driving the stage 23, an electric revolver (electric variable power mechanism) 74 switching an objective lens in the first white light optical system 5, 6, etc. The unit driving system 7 is configured to operate various members configuring the white light interference microscope 1 based on electric signals inputted from the unit control system 8.

The unit control system 8 is configured to connect to the white light optical system 5, the laser optical system 6, and the unit driving system 7 so as to be capable of sending and receiving electric signals, to display an interference image and a laser image, etc. on the display part 41, to perform the autofocus of the white light interference microscope 1 based on the laser image, and to measure the surface shape of the sample SP based on at least one of the interference image and the laser image.

Specifically, the unit control system 8 according to the present embodiment is provided with, as the main components, a scanning control part 8a controlling two-dimensional scanning of laser beam, a first measuring part 8k measuring the surface shape of the sample SP based on the interference image generated by the white light optical system 5, and the second measuring part 8l measuring the surface shape of the sample SP based on the laser image generated by the laser optical system 6. Here, the first measuring part 8k is an example of "mearing part" in the present embodiment, and the second measuring part 8l is an example of "the second measuring part" in the present embodiment. These parts will be described later in detail.

Figure 4:
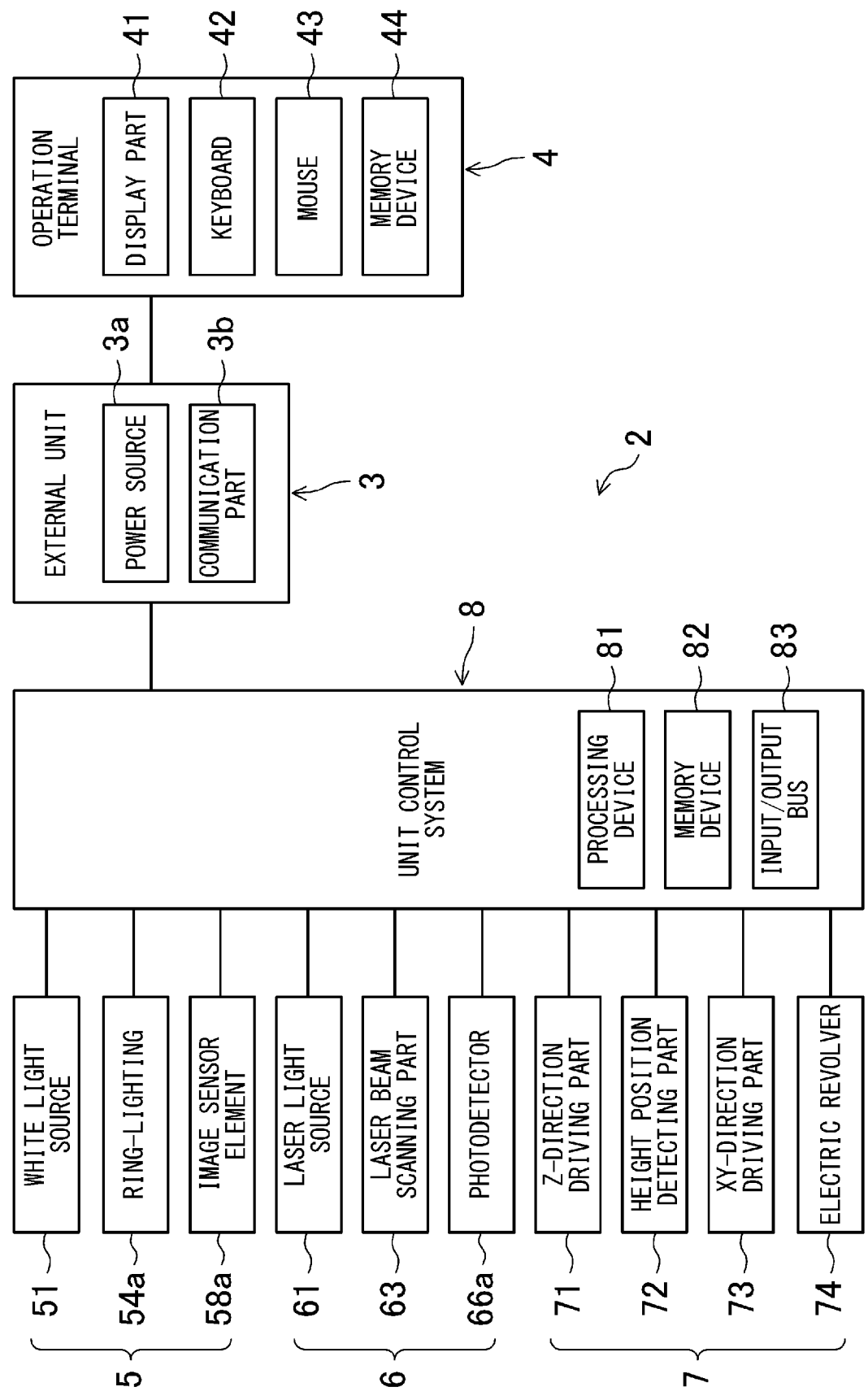
FIG. 4 is a block diagram exemplifying a configuration of the white light interference microscope.

Note that as the example shown in FIG. 4, the unit control system 8 according to the present embodiment is configured by the white light optical system 5, the laser optical system 6, and the unit driving system 7 in a sharing manner, but it is not limited to this configuration. For example, each of the white light optical system 5, the laser optical system 6, and the unit driving system 7 may be connected to a dedicated control system.

Further, the classification of the white light optical system 5, the laser optical system 6, the unit driving system 7, and the unit control system 8 are used for only convenience of systematic explanation, and it is not limited to the presently described configuration. The white light interference microscope 1 according to the present embodiment has components such as the first beam splitter 57, etc. commonly used in the white light optical system 5 and the laser optical system 6.

<White Light Optical System 5>

Figure 3A:
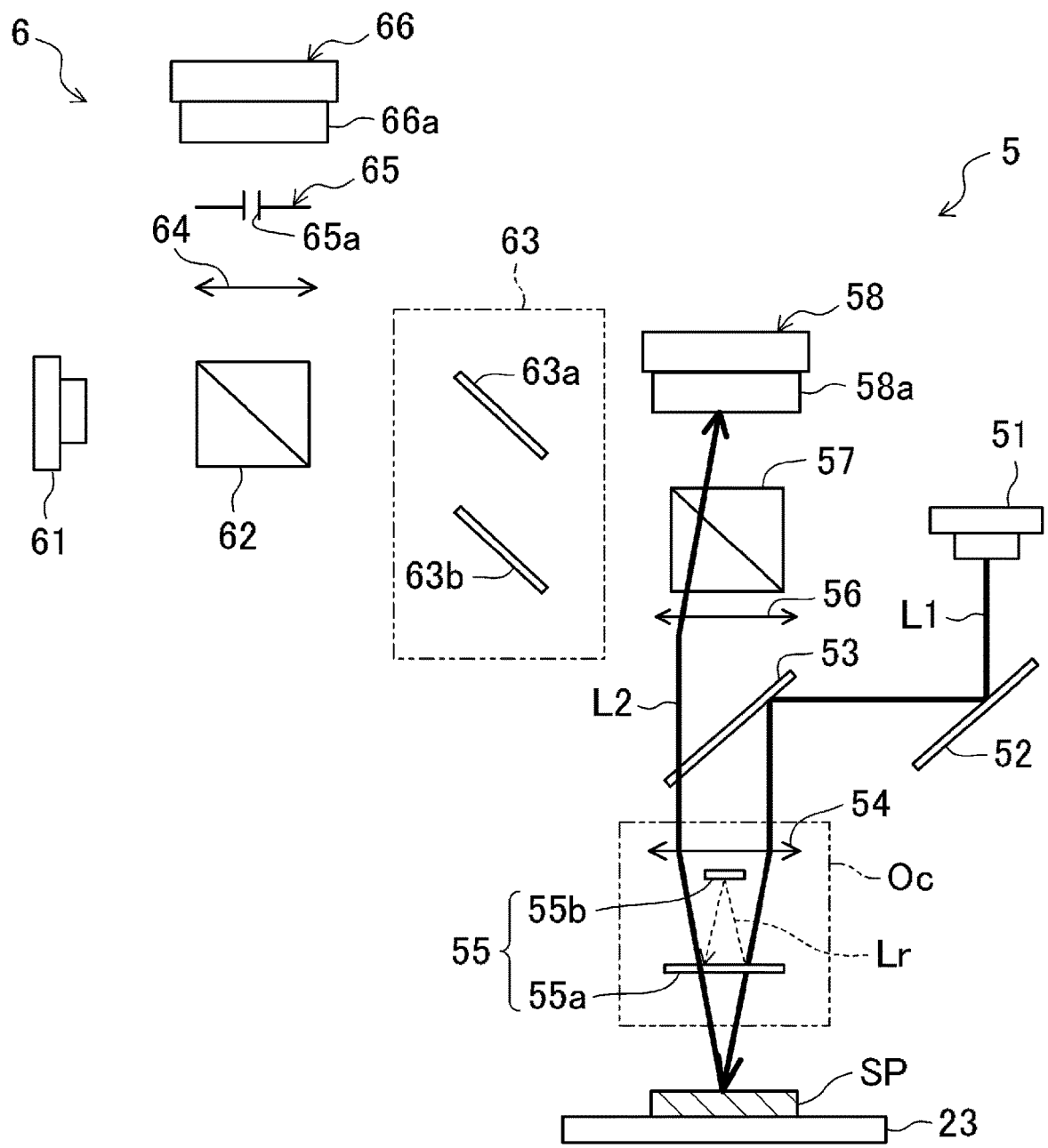
FIG. 3A is a schematic diagram exemplifying a white light optical system of the observation unit.

FIG. 3A is a schematic diagram particularly exemplifying the white light optical system 5 among the optical systems of the observation unit 2. The white light optical system 5 of the observation unit 2 can be configured in a similar manner as the optical system conventionally used in the white color interferometer, and as the light source for observation and measurement, a white light source 51 which will be described later is used. The white light optical system 5 is configured to irradiate white light illuminated from the white light source 51 to the sample SP, and condense the reflected light to an imaging part 58.

Specifically, the white light optical system 5 is provided with a white light source 51, the first mirror 52, the first half mirror 53, an objective lens 54, a branching optical system 55 configuring the interference objective lens Oc with the objective lens 54, the first lens 56, the first beam splitter 57, and the imaging part 58 having image sensor element 58a. Among these, the imaging part 58 is electrically connected with the first measuring part 8k which is one element of the unit control system 8. Note that in an example shown in FIG. 3A, it is configured to built-in the branching optical system 55 in the interference objective lens Oc, but it is not limited to this configuration. As described later, the branching optical system 55 and the objective lens 54 are laid out as an individual member, and if necessary, it can be configured to operate the branching optical system 55.

—White Light Source 51—

The white light source 51 irradiates white light to the sample SP placed on the stage 23 via the objective lens 54 (the interference objective lens Oc when using the white light interferometry)(see reference numeral L1 of FIG. 3A). The white light source 51 functions as a coaxial vertical illumination which is coaxial to the optical axis of the imaging part 58 (particularly, the optical axis of the image sensor element 58a).

Specifically, the white light source 51 according to the present embodiment is provided with, for example, a luminous body 51a which can be configured by a halogen lamp or a white LED (Light Emitting Diode: LED), and an optical component (not shown) on which the white light emitted from the luminous body 51a is made incident.

The white light emitted from the white light source 51 is irradiated to the sample SP via the objective lens 54 and the branching optical system 55 after reflected by the first mirror 52 and the first half mirror 53.

—First Mirror 52—

To the luminous body (not shown) of the white light source 51, the first mirror 52 is arranged in a facing manner in the state in which the mirror surface of the first mirror 52 is inclined. The first mirror 52 reflects the white light emitted from the white light source 51, and this is made incident on the first half mirror 53.

—First Half Mirror 53—

The first half mirror 53 is arranged on the optical axis of the image sensor element 58a. The first half mirror 53 makes the optical axis of the white light coaxial to the optical axis of the image sensor element 58a by reflecting the white light, which was reflected by the first mirror 52, again. The white light which is made coaxial in such manner is irradiated to the sample SP via the objective lens 54.

The white light reflected by the sample SP is returned to the first half mirror 53 via the objective lens 54. The first half mirror 53 transmits the white light reflected in such manner and guides to the imaging part 58 via the first lens 56 and the first beam splitter 57.

—Objective Lens 54 and Branching Optical System 55—

The objective lens 54 is configured as the interference objective lens Oc which is integrated with the branching optical system 55. The interference objective lens Oc can be configured as the objective lens for two-beam interference.

That is, the interference object lens Oc is provided with the objective lens 54 for light convergence, and a branching optical system 55 in which the light (white light or laser beam) passed through the objective lens 54 is separated into two beams (reference light and measurement light), and the separated two beams are overlapped in a state in which each of the optical path lengths is made different.

Specifically, the interference objective lens Oc according to the present embodiment can be configured as a Mirau-type interference objective lens Oc as an example shown in FIG. 3A among the objective lenses which are classified as an objective lens for two-beam interference.

In detail, the branching optical system 55 has a beam splitter for interference 55a, and a reference mirror 55b. When configuring as the Mirau-type interference objective lens Oc, both the beam splitter for interference 55a and the reference mirror 55b are arranged in coaxial to the optical axis of the objective lens 54 as an example shown in FIG. 3A.

In further detail, the beam splitter for interference 55a splits the white light, which was irradiated from the white light source 51 and passed through the objective lens 54, to reference light (see reference numeral Lr in FIG. 3A) which is directed to a predetermined reference surface (mirror surface of the reference mirror 55b in the present embodiment), and measurement light which is directed to the sample SP as a measuring object. The latter measurement light is made incident to the beam splitter for interference 55a again after reflected by the sample SP (see reference numeral L2 in FIG. 3A). On the other hand, the reference mirror 55b reflects the reference light generated by the beam splitter for interference 55a, and it is propagated toward the beam splitter for interference 55a.

Accordingly, the reflected light of the measurement light (measurement light reflected by the sample SP) combines with the reference light reflected by the reference mirror 55b, and it is propagated in the overlapped state to each other. Hereinafter, there is a case that each reflected light of the reference light and the measurement light propagated in the overlapped state to each other may be called as "interference light". Such formed interference light passes through the objective lens 54, the first half mirror 53, the first lens 56, and the first beam splitter 57 in the order, and finally reaches to the imaging part 58.

Note that the interference objective lens Oc is not limited to the aforementioned Mirau-type. For example, Michelson-type interference objective lens can be used. In this case, the reference mirror 55b is arranged at a position off from the optical axis of the objective lens 54 (position becoming non-coaxial to the optical axis of the objective lens 54).

Further, the interference objective lens Oc is not required when the white light source 51 is simply used as illumination. In this case, instead of the interference objective lens Oc having the branching optical system 55, as the example shown in FIG. 3, the objective lens 54 alone can be used. Hereinafter, there is a case that the objective lens 54 which is not provided with the branching optical system 55 may be called as "normal objective lens".

Further, the interference objective lens Oc is not required when the laser beam is used for various processes. In this case, basically, the normal objective lens 54 is used, but as the autofocus which will be described later, even though there is a process in which the laser beam is used, the interference objective lens Oc can be used.

Figure 3B:
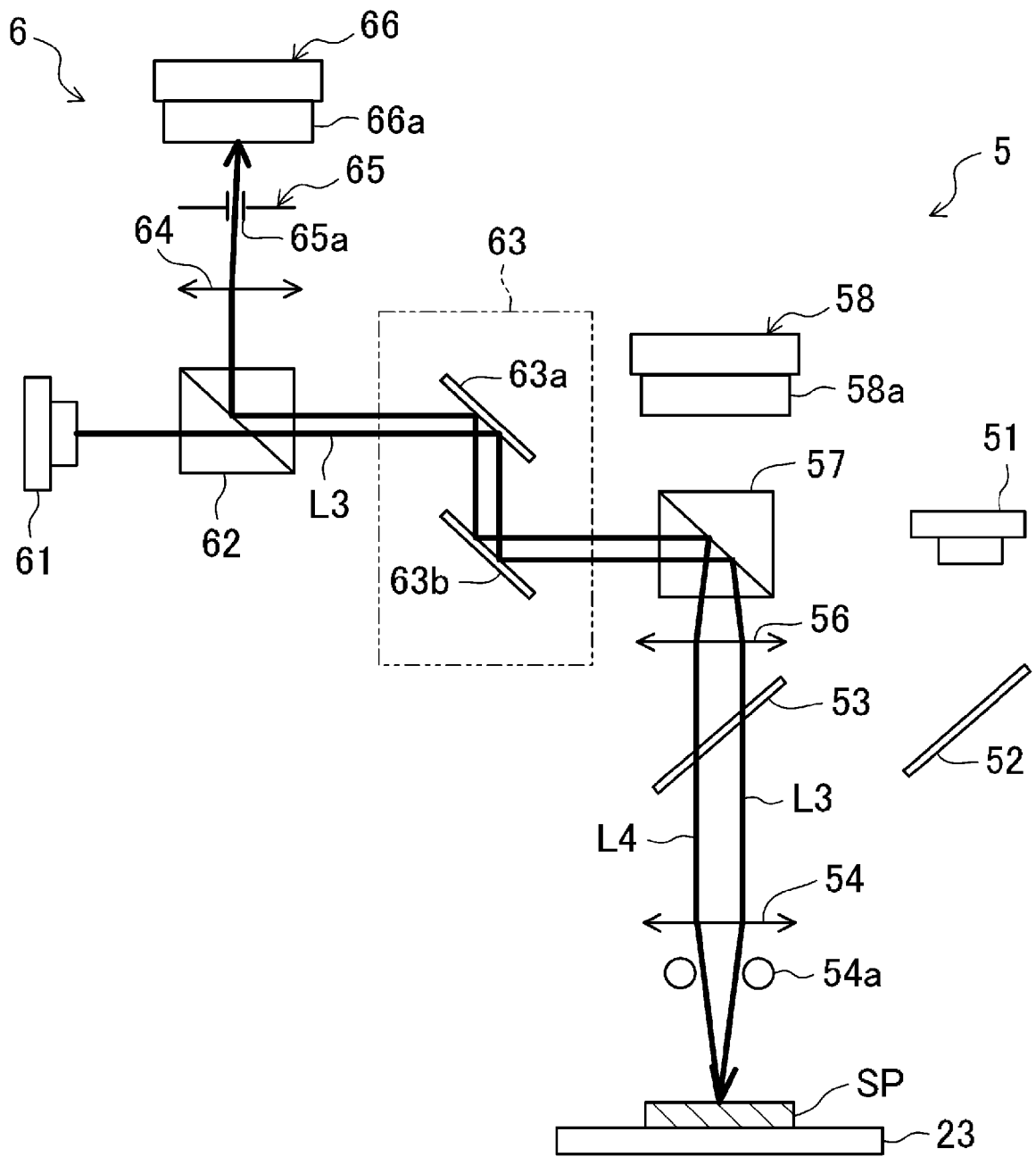
FIG. 3B is a schematic diagram exemplifying a laser optical system of the observation unit.

Further, the detail will be omitted, but as the schematic example shown in FIG. 3B, a ring-lighting 54a is mounted to the objective lens 54, and the ring-lighting 54a can be used as the illumination for observation (non-coaxial vertical illumination).

—First Lens 56—

The first lens 56 is arranged coaxial to the optical axis of the image sensor element 58a. The first lens 56 condenses the white light reflected by the sample SP, and is made incident to the image sensor element 58a via the first beam splitter 57.

—First Beam Splitter 57—

The first beam splitter 57 is arranged on the optical axis of the image sensor element 58a. The first beam splitter 57 is configured as, for example, a cube mirror, and reflects light fitting into a particular wavelength area, specifically, laser beam used in the laser optical system 6.

As the example shown in FIG. 3A, the first beam splitter 57 transmits the white light etc. condensed by the first lens 56 and guides it to the imaging part 58. Further, as the example shown in FIG. 3B, the first beam splitter 57 reflects each of the laser beam (see reference numeral L3 in FIG. 3B) emitted from the laser light source 61, and the reflected light (see reference numeral L4 in FIG. 3B) of the laser beam from the sample SP.

—Imaging Part 58—

The imaging part 58 images an interference image reflecting the interference between the reference light and the measurement light by receiving the reference light reflected by the mirror surface (reference surface) of the reference mirror 55b, and the measurement light reflected by the sample SP as the measuring object. Further, when the white light source 51 is simply used as illumination, the imaging part 58 functions as a camera for imaging the surface of the sample SP.

In detail, the imaging part 58 has an image sensor element 58a for receiving light such as white light, etc. condensed by the first lens 56. The image sensor element 58a performs photoelectric conversion to the light incident through the first lens 56, etc. by the plurality of pixels arranged on the light receiving surface, and convers the electric signal corresponding to the optical image of the object.

The image sensor element 58a may be arranged by aligning a plurality of photodetectors along the light receiving surface. In this case, each photodetector corresponds to a pixel. Specifically, the image sensor element 58a according to the present embodiment is configured by an image sensor made of CMOS (Complementary Metal Oxide Semiconductor), but it is not limited to this configuration. As the image sensor element 58a, for example, the image sensor made of CCD (Charged-Coupled Device) can be used.

And, the imaging part 58 generates an image corresponding to the optical image of the object based on the electric signal converted by the image sensor element 58a, and inputs it to the unit control system 8, etc. Among the images (camera image) generated by the imaging part 58, the image imaging the interference fringes used for the white light interferometry corresponds to the aforementioned "interference image". Needless to say, the images generated by the imaging part 58 include an image for observing the surface of the sample SP.

—Regarding Basic Principle of White Light Interferometry—

As described above, the imaging part 58 receives the reference light reflected by the mirror surface (reference surface) of the reference mirror 55b, and the measurement light reflected by the sample SP as a measuring object. Here, the reflected light of the reference light and the measurement light is propagated in the same light path after emitted from the interference objective lens Oc, but the differences occur in the optical path length when passing through the branching optical system 55, so that the interference occurs when the lights are overlapped to each other.

Here, when the phases of the reference light and the measurement light are matched, both are enhanced by the interference. In this case, the light quantity (light receiving amount) of the light received by the image sensor element 58a becomes large compared with the case that the phases are not matched, so that the light receiving intensity, that is, the illuminance value detected by each pixel becomes large.

On the other hand, the phases of the reference light and the measurement light are not matched, and particularly, when only shifting the half-wavelength, both lights are weakened to each other by the interference. In this case, the light receiving amount of the image sensor element 58a becomes small compared with the case that the phrases are matched, so that the light receiving intensity, that is, the illuminance value detected by each pixel becomes small.

Hence, within the irradiation region of the white light gone through the interference objective lens Oc, a part where the phases of the reference light and the measurement light are matched becomes bright, and a part where they are not matched becomes dark, so that a bright and dark striped pattern (interference fringes) is formed. By imaging the interference fringes, the image part 58 images the interference image reflecting the brightness and darkness.

Here, the phase difference of the reference light and the measurement light is made due to difference of both of the optical path lengths. Therefore, the contrast of the interference fringes and the brightness and darkness arrangement are changed depending on the distance between the sample SP and the interference objective lens Oc.

Accordingly, while changing the relative height position of the interference objective lens Oc with respect to the sample SP, at each height position, an interference image is taken, and by analyzing how the interference fringes between the interference images change, the surface shape of the sample SP such as uneven shape, etc. can be measured.

In order to perform such measurement, the imaging part 58 inputs the electronic signals indicating the interference images taken at each height position to the aforementioned first measuring part 8k. The first measuring part 8k is configured to measure the surface shape of the sample SP based on the plurality of interference images corresponding to the inputted electric signals.

With this, the white light optical system 5 is the optical system capable of performing the shape measurement by the white light interferometry. A space between brightness and darkness of the interference fringes, and a peak width of the light receiving intensity corresponding to each brightness and darkness becomes narrow to not only micrometer, but also the order of nanometer. Further, the space of these interference fringes and the size of the peak width are made due to difference of the optical path lengths, so that they are made constant without depending on the magnification of the objective lens 54, etc. Therefore, this method does not depend on performance of the objective lens 54, etc., and it can perform a measurement in the order of nanometer height, and regarding an accuracy of the height direction (Z-direction) and a resolution in the same direction, excellent measurement compared with a method such as focus synthesizing, laser confocal, etc. can be performed.

(Laser Optical System 6)

FIG. 3B is a schematical diagram exemplifying a laser optical system of the observation unit 2. The laser optical system 6 can be configured as the similar optical system used in the conventional confocal microscope, and as the light source for measuring, a laser light source 61 which will be described later is used. The laser optical system 6 is configured to irradiate the laser beam emitted from the laser light source 61 to the sample SP, and to condense the reflected light to the light receiving part 66.

Specifically, the laser optical system 6 is provided with a laser light source 61, a second beam splitter 62, a laser beam scanning part 63, a first beam splitter 57, a first lens 56, a first half mirror 53, an objective lens 54 or an interference objective lens Oc, a second lens 64, a pinhole plate 65 forming a pinhole 65a, and a light receiving part 66 having a photodetector 66a. Among them, the light receiving part 66 is electrically connected with the second measuring part 8l which is one element of the unit control system 8. The laser optical system 6 is an example of "confocal optical system" in the present embodiment.

That is, when the laser beam is focused on the surface of the sample SP, the laser optical system 6 as a confocal optical system has a layout in which the reflected light of the laser beam is focused at periphery of the pinhole 65a or the photodetector 66a (more specifically, the pinhole 65a is positioned to be "conjugate" with the focal plane of the objective lens 54).

—Laser Light Source 61—

The laser light source 61 irradiates the laser beam to the sample SP placed on the stage 23 via the objective lens 54 which is the same as or different from the interference objective lens Oc. That is, as the example shown in FIG. 3A, the laser beam may be irradiated via the objective lens 54 and the branching optical system 55, or as the example shown in FIG. 3B, the laser beam may be irradiated via only the objective lens 54 in the state in which the branching optical system 55 is not interposed. In the explanation below, it explains the case that the laser beam is irradiated in the state in which the branching optical system 55 is not interposed. The laser light source 61 functions as so-called point light source.

Further, as the laser light source 61, for example, He—Ne gas laser or semiconductor laser, etc. can be used. Further, instead of the laser light source 61, various light sources which can generate point light source can be used, and in this case, for example, it may be a combination of a high-brightness lamp and a slit, etc.

The laser beam outputted from the laser light source 61 passes through the second beam splitter 62 and reaches to the laser beam scanning part 63, and it is irradiated from the laser beam scanning part 63 to the sample SP via the first bam splitter 57, the first lens 56, the first half mirror 53, and the objective lens 54.

—Second Beam Splitter 62—

The second beam splitter 62 is arranged on the optical axis of the laser light source 61, and positioned between the laser light source 61 and the laser beam scanning part 63. The second beam splitter 62 transmits the laser beam outputted from the laser light source 61, and guides it to the laser beam scanning part 63. Further, the second beam splitter 62 reflects the laser beam reflected by the sample SP, and guides it to the light receiving part 66. As the second beam splitter 62, a well-known beam splitter can be used.

—Laser Beam Scanning Part 63—

The laser beam scanning part 63 can perform two-dimensional scanning on the surface of the sample SP by the laser beam irradiated from the laser light source 61. Note that the term "two-dimensional scanning" refers to a two-dimensional operation scanning on the surface of the sample SP by the illumination position of the laser beam.

As shown in FIG. 3B, etc., the laser beam scanning part 63 is configured as so-called dual-axis type galvanoscanner, and it is arranged between the second beam splitter 62 and the first beam splitter 57.

The laser beam scanning part 63 can scan the laser beam along at least one of a predetermined first direction, and the second direction perpendicular to the first direction (both in the drawn examples). Specifically, the laser beam scanning part 63 according to the present embodiment is provided with the first scanner 63a scanning the laser beam incident from the second beam splitter 62 in the first direction, and the second scanner 63b reflecting it toward the first beam splitter 57 while scanning in the second direction.

The term "the first direction" in the present embodiment corresponds to the X-direction as defined before. Further, the term "second direction" corresponds to "Y-direction" as defined similar to the X-direction. Needless to say, it is not limited to these definitions, and the definition of the first direction and the second direction can be arbitrarily changed.

Further, the laser beam scanning part 63 can be any unit as long as it can two-dimensionally scan the laser beam on the surface of the sample SP, so that it is not limited to the aforementioned dual-axis type galvanoscanner. For example, a photoacoustic element system (resonant system), in which a piezoelectric element is adhered to an acousto-optic medium which is made of glass, and by generating an ultrasonic by inputting an electric signal to the piezoelectric element, the light is deflected by diffracting the laser beam which passes through the acousto-optic medium, may be used. A Nipkow disk system, in which by rotating a disk having one line or multiple lines of pinholes in a helical shape, the light passing through the pinholes two-dimensionally scan on the surface of the sample SP, may be used.

The laser beam passed through the laser beam scanning part 63 is reflected by the first beam splitter 57, and it is irradiated to the sample SP via the first lens 56, the first half mirror 53, the objective lens 54.

The laser beam irradiated to the sample SP is reflected by the sample SP and returned to the observation unit 2. Specifically, the reflected light of the laser beam from the sample SP reaches to the second lens 64 reflected by the second beam splitter 62 after passing through the objective lens 54, the first half mirror 53, the first lens 56, and the laser beam scanning part 63.

Further, the laser beam scanning part 63 is operated by the aforementioned scanning control part 8a. Specifically, the laser beam scanning part 63 is electrically connected with the scanning control part 8a, and is configured to be operated by receiving an electric signal inputted from the scanning control part 8a.

—Second Lens 64—

The second lens 64 is arranged in a coaxial manner with the optical axis of the photodetector 66a in the light receiving part 66, and it is positioned between the second beam splitter 62 and the pinhole plate 65. The second lens 64 condenses the reflected light of the laser beam from the second beam splitter 62, and is made incident to the photodetector 66a via the pinhole plate 65.

—Pinhole Plate 65—

The pinhole plate 65 is the plate member which is arranged to be orthogonal to the optical axis of the photodetector 66a, and has a pinhole 65a penetrating the plate member in the plate thickness direction. The pinhole plate 65 is arranged between the second lens 64 and the light receiving part 66. The reflected light of the laser beam condensed by the second lens 64 passes through the pinhole 65a and is made incident to the photodetector 66a As described above, the pinhole 65a is arranged in a position conjugated with the focal plane of the objective lens 54, and the laser optical system 6 can be functioned as the confocal optical system.

—Light Receiving Part 66—

The light receiving part 66 receives the reflected light of the laser beam from the sample SP via the pinhole 65a in the confocal optical system (laser optical system 6), and generates the light reception signal corresponding to the light receiving intensity of the reflected light.

In detail, the light receiving part 66 has a photodetector 66a for receiving the reflected light which is condensed by the second lens 64. The photodetector 66a performs photoelectric conversion to the light incident through the pinhole 65a by the photoelectric surface formed in the incident window, and convers the electric signal corresponding to the light receiving intensity.

It is preferable that the photodetector 66a has high frame rate in comparison with the image sensor element 58a. More preferably, the photodetector 66a has high sensitivity in comparison with the image sensor element 58a. Specifically, the photodetector 66a according to the present embodiment is configured by the light sensor made of PMT (PhotoMultiplier Tube), but it is not limited to this configuration. As the photodetector 66a, the aforementioned image sensor element 58a can be used, and the photo-detectors, for example, a HPD (Hybrid Photo Detector) using avalanche diode, MPPC (Multi-Pixel Photon Counter), etc. can be used.

And, the light receiving part 66 generates an image corresponding to the optical image of the object by associating the electric signal converted by the photodetector 66a with the illumination position of the laser beam, and it is inputted to the unit control system 8, etc. An image (laser image) generated by the light receiving part 66 can be used for a shape measurement by the laser confocal method, and can be used for observing the surface of the sample SP.

—Regarding Basic Principle of Laser Confocal Method—

As described above, the pinhole 65a is arranged at the position conjugated with the focal plane of the objective lens 54. Therefore, when the laser beam emitted from the laser light source 61 focuses on the surface of the sample SP, the reflected light from the surface is converged at the periphery of the pinhole 65a and focuses on the photodetector 66a. In this case (focusing time), the light quantity (light receiving amount) in which the light is received by the photodetector 66a becomes extremely large in comparison with the non-focusing time, so that the light receiving intensity, that is, the illuminance value detected by each pixel becomes large.

On the other hand, when the laser beam does not focus on the sample SP (non-focusing time), the reflected light from the surface of the sample SP does not converge at the periphery of the pinhole 65a and diffuses, and the most part is shielded by the pinhole plate 65. In this case, the light quantity (light receiving amount) in which the light is received by the photodetector 66a becomes extremely small in comparison with the focusing time, so that the light receiving intensity, that is, the illuminance value detected at each pixel becomes small.

Hence, within the scanning area of the laser beam realized by moving the laser beam scanning part 63 by the scanning control part 8a, the part focused on the surface of the sample SP becomes bright, and on the other hand, the part other than that becomes dark. Therefore, based on brightness and darkness of the reflected light of the laser beam, it is possible to measure the surface shape of the sample SP (particularly, information characterizing the height of the sample SP).

In order to perform such measurement, the light receiving part 66 inputs an electric signal indicating the light receiving intensity of the reflected light of the laser beam which is two-dimensionally scanned by the scanning control part 8a and the laser beam scanning part 63 to the aforementioned second measuring part 8l. The second measuring part 8l measures the surface shape of the sample SP based on the light receiving intensity (particularly, brightness and darkness of the reflected light) indicated by the inputted electric signal.

With this, the laser optical system 6 is the optical system capable of performing a shape measurement by the laser confocal method, and only the substantially focused light is detected, so that it is not good as the white light interferometry, but when comparing with other methods such as focus synthesizing, etc., the luminance information in which the accuracy of the height direction (Z-direction) and the resolution in the same direction are excellent can be provided.

Further, the shape measurement by the laser confocal method is performed by the laser beam irradiated to a spot shape with the two-dimensional scanning, so that when comparing with the white light interferometry, the luminance information in which the resolution in the horizontal direction is excellent can be provided.

(Unit Driving System 7)

FIG. 4 is a block diagram exemplifying a configuration of the white light interference microscope 1. The unit driving system 7 is the one driving each part of the white light interference microscope 1, and is configured as the system changing the objective lens 54, adjusting the height position of the stage 23 with respect to the objective lens 54, and moving the stage 23 along the horizontal direction. Each component element of the unit driving system 7 is electrically connected to the unit control system 8, and operates by receiving the electric signal inputted from the unit control system 8.

Specifically, as the examples shown in FIGS. 1, 2, 4, etc., the unit driving system 7 is provided with a Z-direction driving part 71, a height position detecting part 72, a XY-direction driving part 73, and an electric revolver 74.

The Z-direction driving part 71 is an example of "driving part" in the present embodiment.

—Z-Direction Driving Part 71—

The Z-direction driving part 71 is the one relatively changing the height position of the stage 23 with respect to the objective lens 54. Specifically, the Z-direction driving part 71 has, for example, a stepping motor, and a movement conversion mechanism converting the rotary motion of the output shaft in the stepping motor to the linear motion in the vertical direction (Z-direction). The Z-direction driving part 71 is built in the head part 22.

By rotating the stepping motor of the Z-direction driving part 71, the electric revolver 74 and the objective lens 54 mounted to the electric revolver 74 are integrally moved along the Z-direction.

For example, by moving the objective lens 54 in the Z-direction in the fixed state of the stage 23, as a result, the height position of the stage 23 can be relatively changed with respect to the objective lens 54. Note that the stage 23 may be configured to be moved in the fixed state of the objective lens 54.

Note that the Z-direction driving part 71 can adjust the relative height position (hereinafter referred to as "relative distance", or simply referred to as "height position") of the stage 23 with respect to the objective lens 54 in a pitch size of approximately 1 nm at minimum.

—Height Position Detecting Part 72—

The height position detecting part 72 detects the relative distance between the objective lens 54 and the stage 23, and outputs an electric signal corresponding to the relative distance. This electric signal is inputted to the unit control system 8.

Specifically, the height position detecting part 72 can be configured by, for example, a linear scale (linear encoder), etc. The height position detecting part 72 is capable of detecting even if the change of the relative distance between the objective lens 54 and the stage 23 is approximately 1 nm.

In the present embodiment, by moving the objective lens 54 in the Z-direction in the fixed state of the stage 23, the aforementioned relative distance is changed. By detecting the moving amount in the linear scale at this time, the relative height position of the stage 23 with respect to the objective lens 54 can be detected. Similarly, when the stage 23 is moved in the Z-direction in the fixed state of the objective lens 54, the height position can be detected in the similar manner.

—XY-Direction Driving Part 73—

The XY-direction driving part 73 is the mechanism to move the stage 23 in the horizontal direction. That is, the stage 23 is separately provided from the stage support member 24 shown in the example of FIG. 1, and is supported movably in the horizontal direction with respect to the stage support member 24.

Specifically, the XY-direction driving part 73 is configured by the actuator such as, for example, a linear motor, etc. This actuator can move the relative position of the stage 23 with respect to the stage support member 24 within a predetermined range along the X-direction and the Y-direction.

—Electric Revolver 74—

The electric revolver 74 is configured as an electric variable power mechanism, and rotates around a predetermined center axis Ar. The electric revolver 74 is configured that a plurality of objective lenses 54 are detachable in a surrounding manner of the center axis Ar. Here, the objective lenses 54 attachable to the electric revolver 74 includes the objective lenses 54 in which the ring-lighting 54a is mounted, the objective lenses 54 in which the ring lighting 54a is not mounted, and the objective lenses 54 configured with the interference objective lens Oc which is integrated with the branching optical system 55.

By rotating the electric revolver 74, one objective lens is selected among the plurality of objective lenses 54, and it can be faced to the sample SP placed on the stage 23. Note that among the plurality of objective lenses 54, the information indicating which objective lens is selected is stored in the memory device 82 of the unit control system 8.

By controlling the electric revolver 74, the magnification of the white light optical system 5 and the laser optical system 6 is changed, and the interference objective lens Oc which is necessary for the white light interferometry can be faced to the sample SP. In addition to the electric revolver 74, or instead of the electric revolver 74, the single lens type objective lens (not shown) consisting of the electric zoom lens may be used.

The electric revolver 74 can be operated via the screen (see FIGS. 15 to 17 which will be described later) displayed on the display part 41, or can be operated via a switch provided in the observation unit 2, etc.

(Unit Control System 8)

Figure 5:
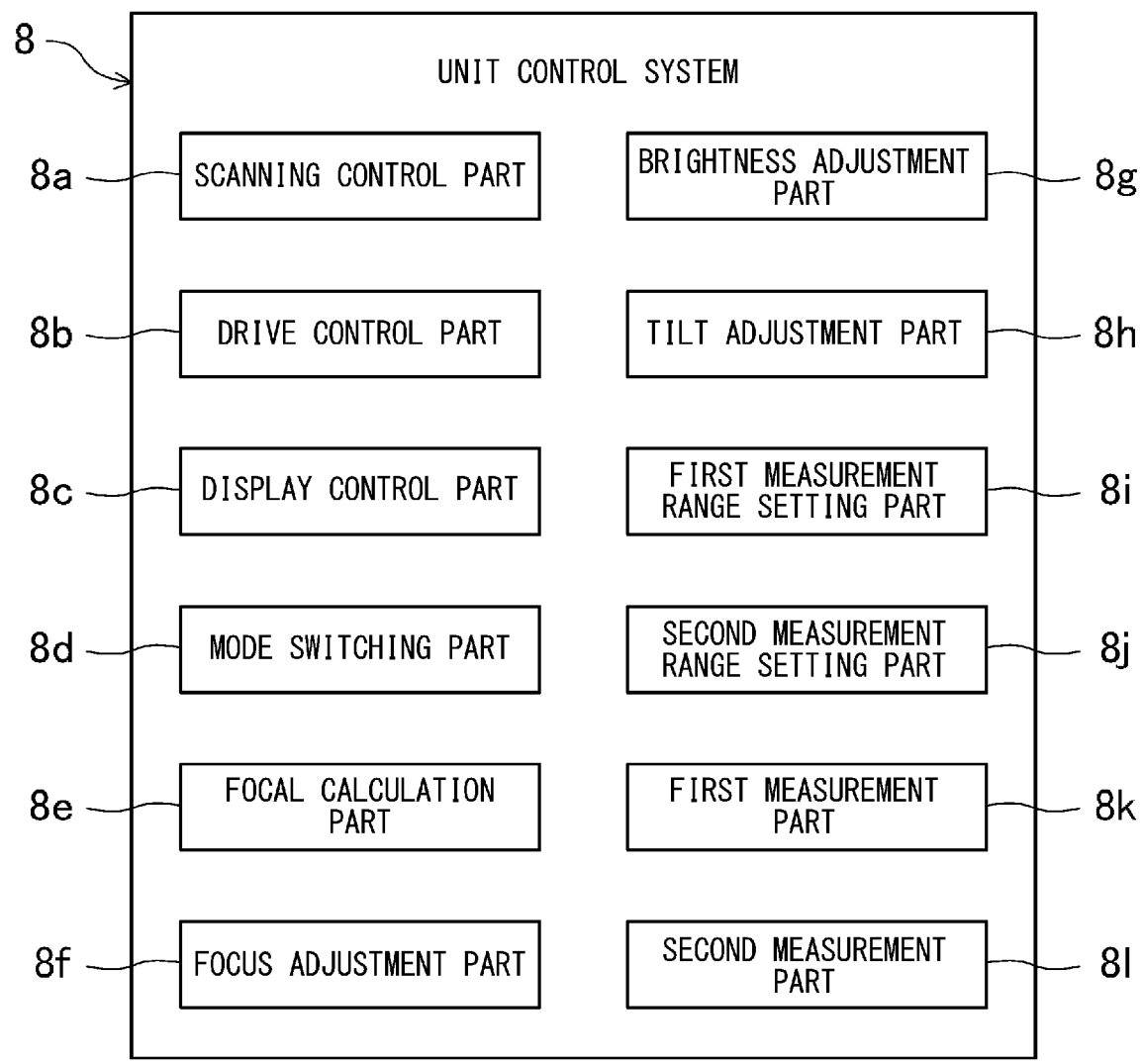
FIG. 5 is a block diagram exemplifying a configuration of a unit control system.

FIG. 5 is a block diagram exemplifying the configuration of the unit control system 8. The unit control system 8 outputs a control signal to each part of the white light optical system 5, the laser optical system 6, and the unit driving system 7 in the observation unit 2, and controls these operations, and measures the surface shape of the sample SP by receiving a detection signal from each part.

Further, in addition to the observation unit 2, the unit control system 8 is electrically connected to the operation terminal 4, and the measurement result of the surface shape is displayed on the display part 41, and as well as, a control signal which is inputted to each part of the observation unit 2 can be generated based on the operation input to the keyboard 42, the mouse 43, etc.

Note that in the example shown in FIG. 4, the unit control system 8 is provided in the observation unit 2, but it is not limited to this configuration. The unit control system 8 may be provided in the external unit 3, or may be provided in the operation terminal 4.

Specifically, the unit control system 8 according to the present embodiment has the processing device 81 made of a CPU, a system LSI, a DSP, etc., a memory device 82 made of a volatile memory, nonvolatile memory, etc., and an input/output bus 83. Further, the unit control system 8 may be realized by a logical circuit, or may be realized by performing software.

In detail, as the example shown in FIG. 4, in the unit control system 8, at least the white light source 51, the ring-lighting 54a, the image sensor element 58a, the laser light source 61, the laser beam scanning part 63, the photodetector 66a, the Z-direction driving part 71, the height position detecting part 72, the XY-direction driving part 73, and the electric revolver 74 are electrically connected. By the unit control system 8, the white light source 51, the ring-lighting 54a, the laser light source 61, the laser beam scanning part 63, the Z-direction driving part 71, the XY-direction driving part 73, and the electric revolver 74 are controlled. Further, the output signals of the image sensor element 58a, the photodetector 66a, and the height position detecting part 72 are inputted to the unit control system 8.

Specifically, as the example shown in FIG. 5, the unit control system 8 according to the present embodiment is provided with, as main component elements, a scanning control part 8a, a drive control part 8b, a display control part

8c, a mode switching part 8d, a focal calculation part 8e, a focus adjustment part 8f, a brightness adjustment part 8g, a tilt adjustment part 8h, the first measurement range setting part 8i, the second measurement range setting part 8j, the first measuring part 8k, and the second measuring part 8l.

—Scanning Control Part 8a—

The scanning control part 8a is electronically connected with the aforementioned laser beam scanning part 63 and controls its operation. The laser beam scanning part 63 can two-dimensionally or one-dimensionally scan within a predetermined scanning range Rsc on the surface of the sample SP according to the control signal inputted from the scanning control part 8a. The setting of the scanning range Rsc can be arbitrarily changed according to the functions performed by the white light interference microscope 1. The scanning range Rsc will be described with reference to FIGS. 7B to 7D.

—Drive Control Part 8a—

The drive control part 8b controls each part of the unit driving system 7. Specifically, the drive control part 8b changes the height position of the stage 23 by controlling the Z-direction driving part 71, changes the horizontal position of the stage 23 by controlling the XY-direction driving part 73, and switches the objective lenses 54 by controlling the electric revolver 74.

—Display Control Part 8c—

The display control part 8c is electrically connected with the display part 41 of the operation terminal 4, and controls the display mode on the display part 41. Specifically, in the display control part 8c according to the present embodiment, the measurement results by the first measuring part 8k, the second measuring part 8l, etc. can be displayed, the camera images generated by the imaging part 58 can be displayed, or other than that, various interfaces can be displayed.

—Mode Switching Part 8d—

As described up until this point, the white light interference microscope 1 performs, as the main functions, the observation of the sample SP by using the laser beam or the white light as a light source, the measurement of the sample SP by using the laser confocal method or the white light interferometry, etc.

The mode switching part 8d can selectively use these functions based on the operation inputs by the user via the keyboard 42 and the mouse 43. Specifically, based on the operation inputs of the user, the mode switching part 8d according to the present embodiment selects one from the mode group including, for example, the first mode measuring the surface shape of the sample SP, the second mode (the detail is omitted) measuring a film thickness of the sample SP, the third mode observing the sample SP, and these functions can be performed. As described later, the operation inputs of the user are performed via the interface displayed on the display part 41. Note that among the aforementioned three operation modes, the second mode and third mode are optional. The white light interference microscope 1 may be configured to be capable of performing at least the first mode only.

—Focal Calculation Part 8e—

By using the laser confocal method by the laser optical system 6, the focal calculation part 8e matches the focus of the objective lens 54 with the surface of the sample SP (in other words, "autofocus" is performed by the laser confocal method). The focus adjusted by the laser confocal method is used for both of the measurement of the surface shape by the laser confocal method and the measurement of the surface shape by the white light interferometry.

That is, as shown in FIG. 7A, the white light interference microscope 1 according to the present embodiment is configured to focus on by using the laser confocal method when measuring the surface shape of the sample SP by using the white light interferometry.

Note that when it is focused, as the objective lens 54, the interference objective lens Oc (the first objective lens Oc) for white light interference may be used, and the objective lens 54 for non-white light interference which is different from the interference objective lens Oc may be used.

Specifically, the focal calculation part 8e according to the present embodiment calculates a focal position where the focus of the objective lens 54 is made coincide with the surface of the sample SP at each height position of the stage 23 or the objective lens 54, based on the light reception signal generated by the light receiving part 66 of the laser optical system 6. The focal calculation part 8e is the example of "calculation part" in the present embodiment.

Here, the phrase "each height position of the stage 23 or the objective lens 54" refers to the relative height position of the stage 23 with respect to the objective lens 54 which is capable of being detected by the height position detecting part 72. The height position can be defined as the distance between the front end face of the objective lens 54 (front end face in the Z-direction) and the upper surface of the stage 23, but it is not limited to this, and it may be the separation distance of the Z-direction between a predetermined part of the objective lens 54 and a predetermined part of the stage 23. As described above, the height position is called as "Z-position".

Further, in the description below, the term "the distance of the height positions (Z-pitch) each other" refers to the distance of the height positions (moving distance of the objective lens 54 and the stage 23 in the Z-direction) when generating interference images in the white light optical system 5, and when receiving the laser beam in the laser optical system 6 in the case of the setting of the height range (measurement range) at the time of the autofocus, the brightness adjustment, the measurement, the measurement of the surface shape, etc.

Further, in the following description, the phrase "the Z-position is moved upward" refers to the case in which the objective lens 54 is moved upward with respect to the stage 23 and the sample SP, or the stage 23 and the sample SP are moved downward with respect to the objective lens 54, that is, the stage 23 and the sample SP are separated from the objective lens 54 in the Z-direction.

Similarly, the phrase "the Z-position is moved downward" refers to the case in which the objective lens 54 is moved downward with respect to the stage 23 and the sample SP, or the stage 23 and the sample SP is moved upward with respect to the objective lens 54, that is, the stage 23 and the sample SP approach to the objective lens 54 in the Z-direction.

In detail, the focal calculation part 8e acquires a light reception signal by irradiating the laser beam at each height position while changing the height position via the drive control part 8b. As described above, when the laser beam focuses on the surface of the sample SP, the light quantity (light receiving amount) in which the photodetector 66a receives the light becomes relatively larger than the non-focusing time, and the light receiving intensity becomes relatively large.

Accordingly, the focal calculation part 8e monitors a curve line (hereinafter referred to as "Z-I curve") indicating the change of the light receiving intensity with respect to the height position (Z-position) as the example shown in FIG.

6B, and searches the height position where the light receiving intensity becomes a peak. Such searched height position is determined as the focal position Zp. This focal position Zp is temporarily or continuously memorized in the memory device 82, and is inputted to the focus adjustment part 8f.

Further, the height position used for the search of the focal position Zp becomes discrete position. The distance of the height positions (Z-pitch) each other is set according to the half-band width of the Z-I curve. Specifically, when it is assumed that the half-band width of the Z-I curve is narrow, the Z-pitch is set narrow as compared to the case in which it is assumed that the half-band width of Z-I curve is wide. Here, when the numerical aperture of the objective lens 54 is large, the half-band width of the Z-I curve becomes narrow in comparison with the case in which the numerical aperture of the objective lens 54 is small. Generally, the numerical aperture of the objective lens 54 becomes larger as its lens magnification becomes higher magnification.

Based on the aforementioned knowledge, the focal calculation part 8e according to the present embodiment is configured to set the aforementioned defined Z-pitch narrower while the magnification of the objective lens 54 becomes higher. Specifically, when the height position of the stage or the objective lens 54 is adjusted by operating the Z-direction driving part 71 via the drive control part 8b, the focal calculation part 8e changes the height position in narrower Z-pitch, and acquires a light reception signal at each height position. Accordingly, depending on the magnification of the objective lens 54, the Z-pitch in which the light reception signal is acquired can be changed.

As a result of further proceeding the study according to the Z-pitch, the present inventors have newly found that the size of the Z-pitch is adjusted depending on the function performed by the white light interference microscope 1.

Specifically, in the present embodiment, when the focal calculation part 8e calculates the focal position Zp, each distance of the height positions (Z-pitch) each other of the stage 23 is set wider than the case in which the second measuring part 8l measures the surface shape of the sample SP used for laser confocal method.

That is, when the focal calculation part 8e searches the focal position Zp, it does not require the measurement accuracy of the light receiving intensity in comparison with the case in which the second measuring part 8l measures the surface shape. Therefore, as the examples shown in each drawing including FIG. 7A, when the focal position Zp is searched (when the focal calculation part 8e searches the focal position Zp), in comparison with the case in which the surface shape is measured (when the first measuring part 8k or the second measuring part 8l measures the surface shape of the sample SP), it is permitted that the Z-pitch is more coarsely set. Hereinafter, the Z-pitch used when the focal position Zp is searched may be called as "first pitch".

Figure 6A:
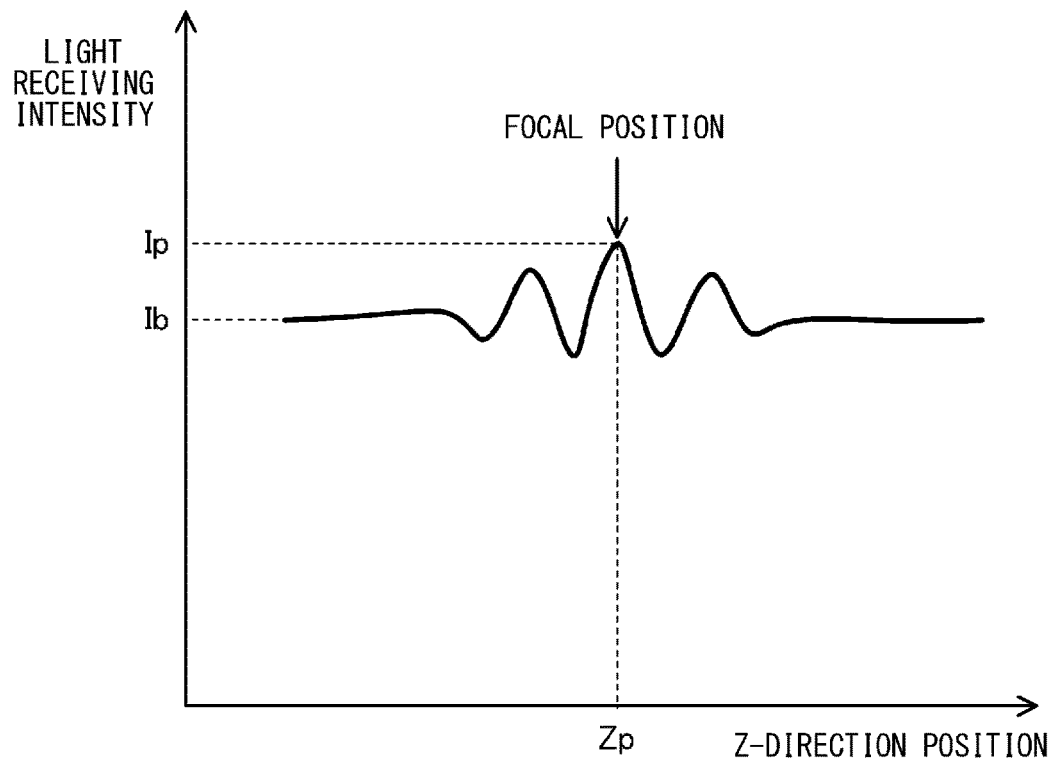
FIG. 6A is a diagram exemplifying, in a pixel, a relationship between a relative position of a Z-direction of a sample and a light receiving intensity caused by the interference light of white light.
Figure 6B:
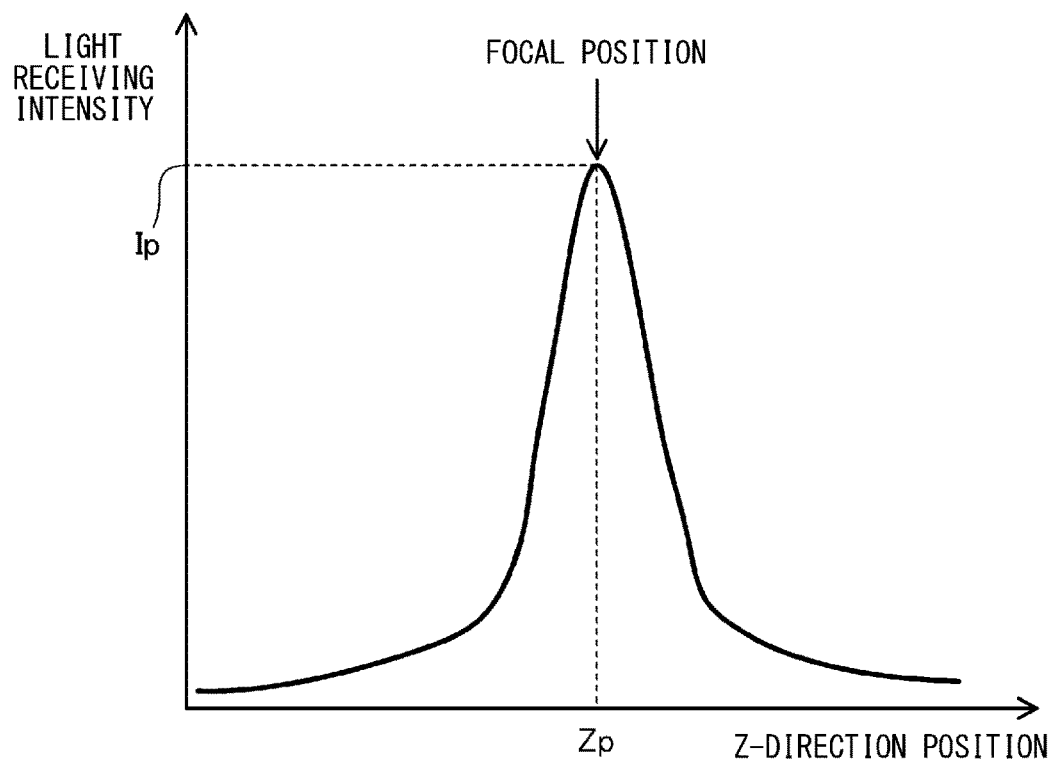
FIG. 6B is a diagram exemplifying, in a pixel, a relationship between the relative position of the Z-direction of the sample and a light receiving intensity caused by a reflected light of a laser beam.
Figure 6C:
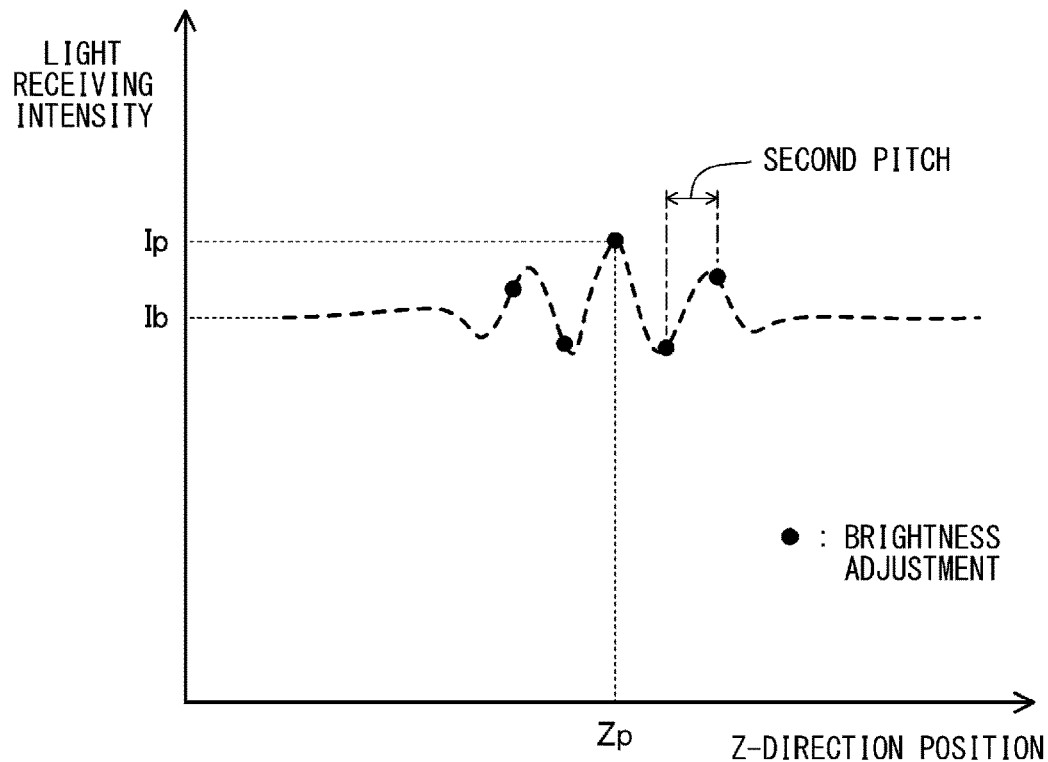
FIG. 6C is a diagram exemplifying a size of a second pitch.
Figure 6D:
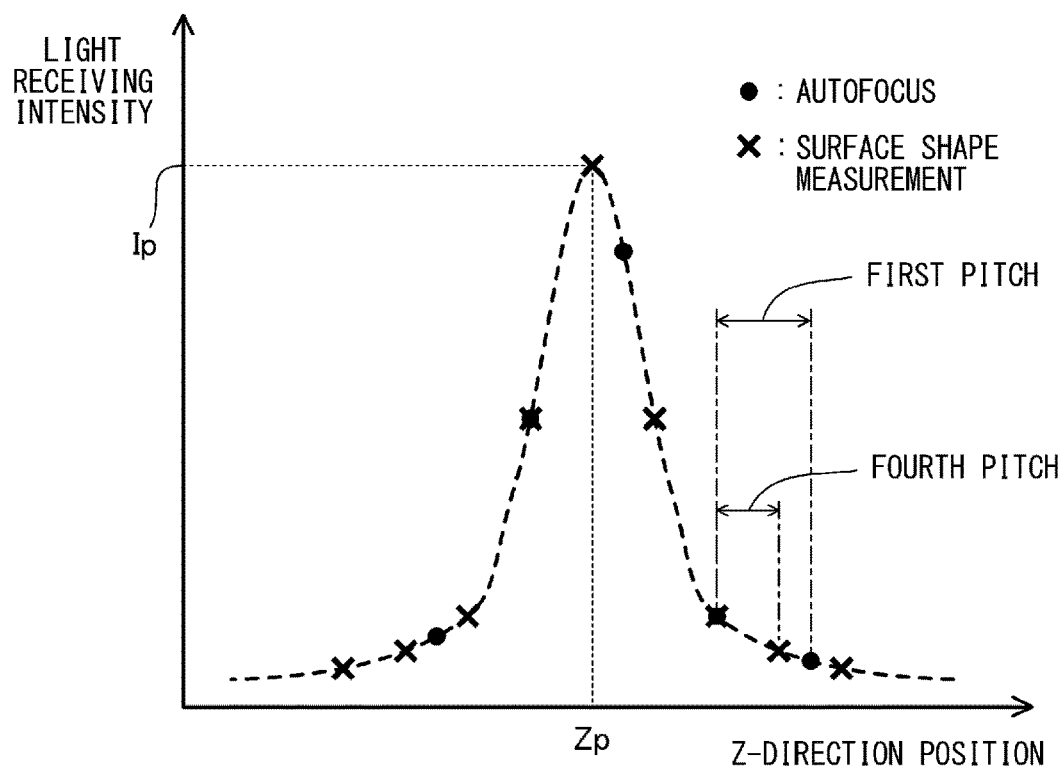
FIG. 6D is a diagram comparing sizes of the fourth pitch and the first pitch.

For example, in FIG. 6D, the plots filled with black color refer to the height positions used when the position Zp is searched (at the time of autofocus), and the cross-shaped plots refer to the height positions used when the surface shape is measured. As shown in FIG. 6D, the first pitch according to the present embodiment can be more coarsely (widely) set in comparison with the fourth pitch, which will be described later, as the Z-pitch used when the surface shape is measured.

Further, the search of the focal position Zp can be performed by fitting the light receiving intensity measured at each height position by the parabolic curve, Gaussian function, etc. The detail of the fitting will be omitted.

Further, as described above, when searching the focal position Zp, the laser beam is emitted at each height position. At this time, the scanning range Rsc of the laser beam can be set in an appropriate range for the search of the focal position Zp.

Figure 7B:
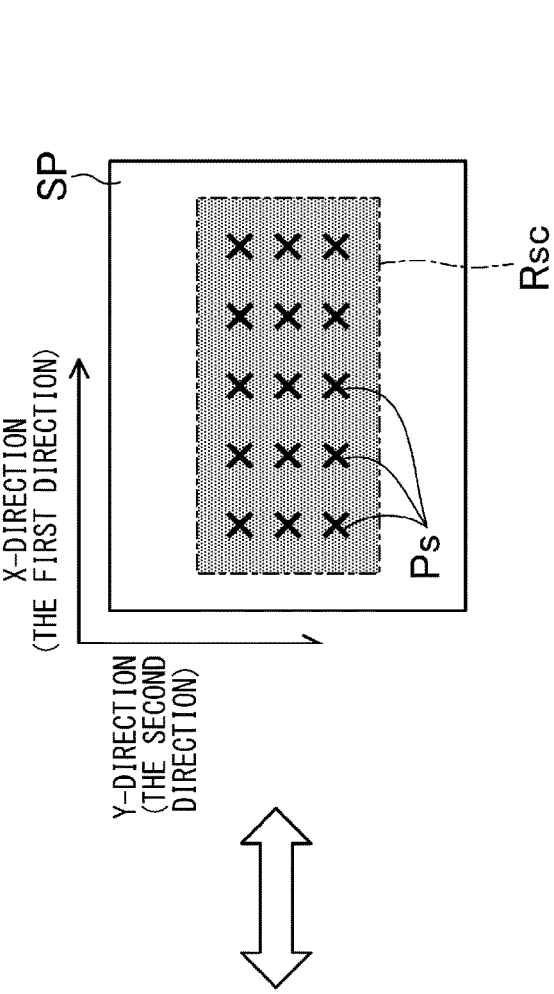
FIG. 7B is a diagram exemplifying a scanning range at the time of autofocus.
Figure 7B:
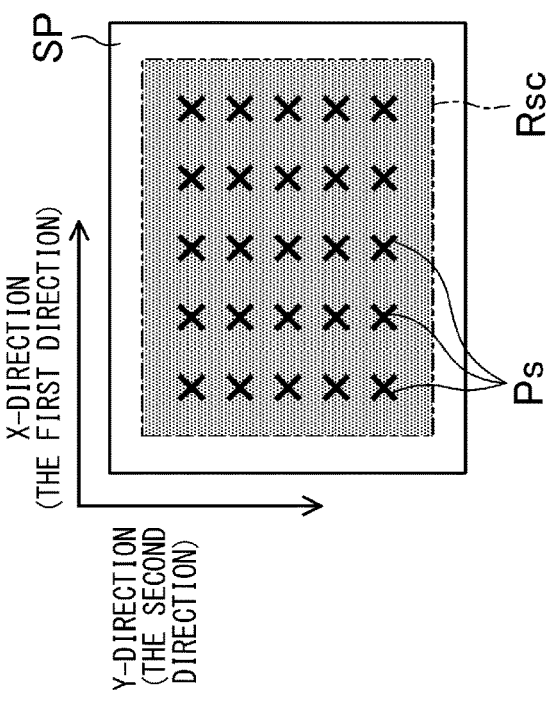
Figure 7C:
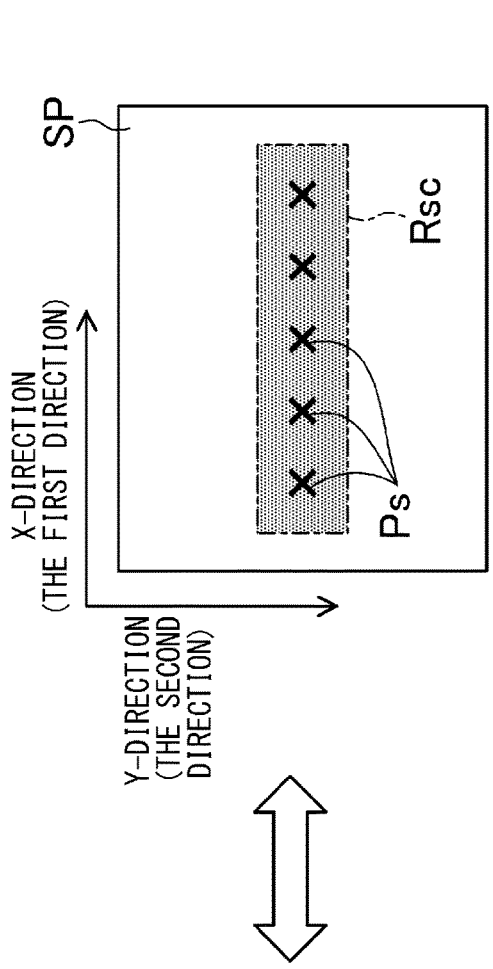
FIG. 7C is a diagram exemplifying a scanning range at the time of autofocus.
Figure 7C:
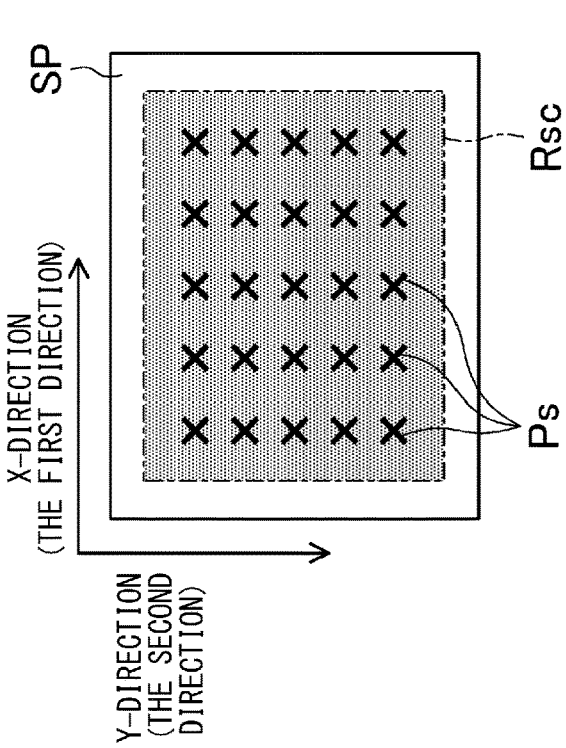
Figure 7D:
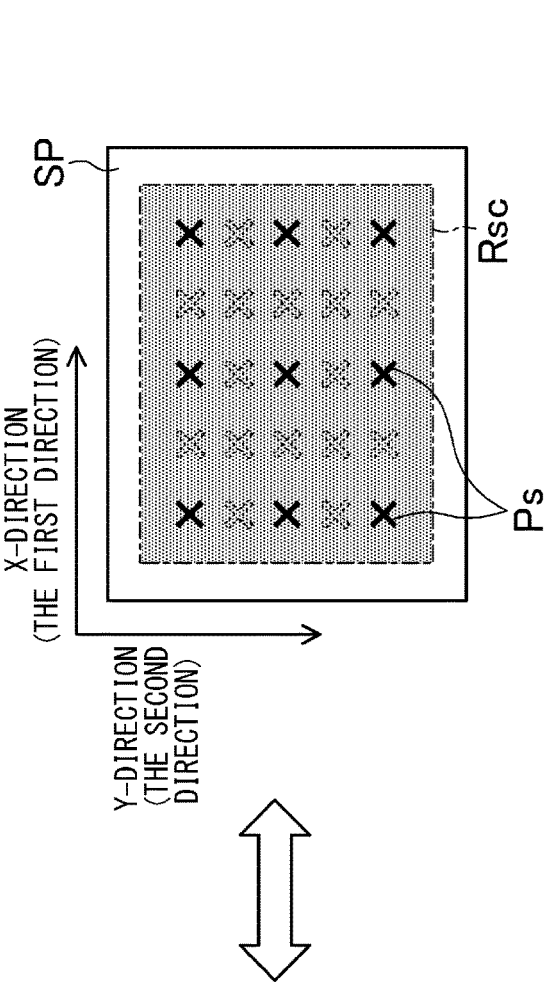
FIG. 7D is a diagram exemplifying a scanning range at the time of autofocus.
Figure 7D:
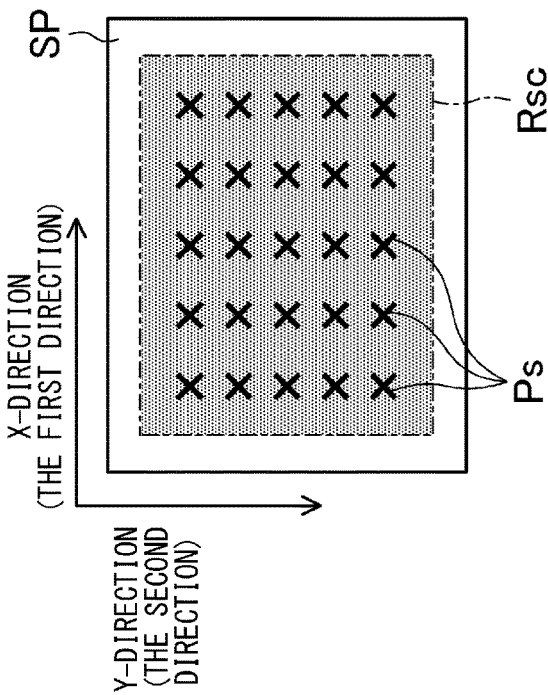

Here, FIGS. 7B to 7D are the drawings exemplifying the scanning range Rsc at the time of autofocus. In each drawing, the scanning range Rsc is the range set on the surface of the sample SP, and the irradiation range of the laser beam by, particularly, the first scanner 63a and the second scanner 63b is schematically shown. The laser beam is configured to be discretely irradiated along the first direction and the second direction, and the illumination position Ps of each laser beam is set within the scanning range Rsc exemplified in each drawing.

Specifically, the scanning control part 8a scans the laser beam when calculating the focal position Zp by the focal calculation part 8e by operating the laser beam scanning part 63 at each height position of the stage 23. In this case, when the focal calculation part 8e calculates the focal position Zp, the scanning range Rsc of the laser beam can be set to be narrower than the case in which the second measuring part 8l measures the surface shape based on the laser confocal method (see the fourth line in FIG. 7A).

In detail, when the focal calculation part 8e calculates the focal position Zp, in the scanning range Rsc of the laser beam, the dimension in one of the first and second directions may be set shorter than the case in which the second measuring part 8l measures the surface shape. For example, as shown in FIG. 7B, the laser beam can be configured to be irradiated to 25 portions in total, 5 ways in the first direction at the time of the measurement of the surface shape, and 5 ways in the second direction, and on the other hand, the laser beam can be configured to be irradiated to 15 portions in total, 3 ways in the first direction at the time of autofocus (at the time of the calculation of the focal position Zp), and 5 ways in the second direction.

Further, in detail, in the present embodiment, when the focal calculation part 8e calculates the focal position Zp, the scanning control part 8a linearly scans the laser beam along the X-direction as the first direction. In this case, the scanning range is set to make the dimension in the Y-direction as the second direction short. Here, the laser beam may scan over arrays lined up in parallel to each other. For example, as shown in FIG. 7C, the laser beam can be configured to be irradiated to 25 portions in total, 5 ways in the first direction at the time of the measurement of the surface shape, 5 ways in the second direction, and on the other hand, by scanning the laser beam along the first direction at the time of the autofocus (at the time of the calculation of the focal position Zp), the laser beam can be configured to be irradiated to 5 portions in total, 5 ways in the first direction, and 1 way in the second direction.

Alternatively, instead of performing the aforementioned configurations, when the focal calculation part 8e calculates the focal position Zp, the scanning interval of the laser beam (the distance of the illumination positions Ps each other of the laser beam) can be set to be wider than the case in which the second measuring part 8l measures the surface shape (sparse scan). With this, the autofocus can be performed at high speed. For example, as shown in FIG. 7D, the laser beam can be configured to be irradiated to 25 portions in total, 5 ways in the first direction at the time of the measurement of the surface shape, and the 5 ways in the second direction, and on the other hand, at the time of the autofocus (at the time of the calculation of the focal position Zp), the area of the scanning range Rsc is still held, but by widening the distance of the illumination positions Ps each other, the laser beam can be configured to be irradiated to 9 portions in total, 3 ways in the first direction, and 3 ways in the second direction.

—Focal Adjustment Part 8f—

The focus adjustment part 8f is made coincide the height position with the focal position Zp calculated by the focal calculation part 8e by adjusting the height position of the stage 23 or the objective lens 54 by operating the Z-direction driving part 71 via the drive control part 8b.

The focus adjustment part 8f adjusts the height position, and the objective lens 54 can focus on the sample SP, so that the suitable condition for the measurement of the sample SP is realized.

Note that in addition to at the time of the measurement of the surface shape by the first measuring part 8k or the second measuring part 8l, the adjustment of the height position by the focus adjustment 8f is performed when observing the laser image or the camera image, adjusting the brightness described below by the brightness adjustment part 8g, adjusting the tiling by the tilt adjustment part 8h, and setting the height range by the first and second measurement range setting parts 8i, 8j, etc. With this, various processes can be started from the focusing state, so as to accelerate its processing speed.

—Brightness Adjustment Part 8g—

The processing by the focal calculation part 8e and the focus adjustment part 8f is performed by using the laser beam, so that when the focus adjustment part 8f focuses, the setting of white light such as an appropriate exposure time, etc. is unknown. In order to smoothly combine the autofocus by the laser confocal method, and the shape measurement by the white light interferometry, it is necessary to perform the setting of the white light after the autofocus.

Then, the brightness adjustment part 8g starts the brightness adjustment of the white light irradiated from the white light source 51 in the state in which the height position is adjusted by the focus adjustment part 8f In addition to the control parameter which is the actual white light source 51, the adjusting target includes a parameter characterizing the image sensor element 58a for receiving the white light. For example, in order to adjust the brightness of the white light, the brightness adjustment part 8g can adjust at least one of the exposure time and the gain of the image sensor element 58a. The word "brightness of white light" includes the meaning of "brightness of interference image".

Specifically, the brightness adjustment part 8g according to the present embodiment sets a starting position based on the focal position Zp calculated by the focal calculation part 8e, and changes the height position from the starting position to the stage 23 or the objective lens 54 upward or downward in a predetermined Z-pitch (second pitch). The brightness adjustment part 8g irradiates the white light from the white light source 51 at each height position changed in the second pitch. In this case, the size of the second pitch does not rely on the numerical aperture of the objective lens 54, etc., and it is defined based on the wavelength of the white light.

For example, in FIG. 6C, the plots filled with black color refer to the height positions used when the brightness adjustment part 8g adjusts the brightness of the white light (at the time of the brightness adjustment). As shown in FIG. 6C, the height position used at the time of the brightness adjustment can be set within a predetermined range including the focal position Zp.

Note that the brightness adjustment part 8g according to the present embodiment is configured to set the focal position Zp to be the starting position, but it is not limited to the configuration. For example, the height position changed upward or downward from the focal position Zp to the predetermined height position is defined as the starting position, and by moving downward or upward from the starting position to the stage 23 or the objective lens 54 in the second pitch, the height position may be changed.

The brightness adjustment part 8g adjusts the brightness of the white light based on a plurality of interference images generated in the state where the height position is differentiated. Specifically, the brightness adjustment part 8g selects an interference image including relatively bright pixels (particularly, the brightest pixel in the present embodiment) among the interference images generated via the imaging part 58. For example, the selection of an interference image can be performed by comparing the light receiving intensity, which is used to generate each interference image, in each pixel.

The brightness adjustment part 8g adjusts the brightness of the white light source 51 within the range in which each pixel in the selected interference image (the brightest interference image) is not saturated. In detail, the brightness adjustment part 8g adjusts the exposure time and the gain of the image sensor element 58a to make the interference image bright as much as possible within the range falling below the predetermined upper limit value in each pixel in the selected interference image, and the optimum parameter is determined. The determined parameter is inputted to the memory device 82, etc., and is temporary or continuously stored.

—Tilt Adjustment Part 8h—

The tilt adjustment part 8h calculates the tilt of the stage 23, and corrects the tilt. The detail will be omitted, but as the tilt correction method, arbitrary methods such as an automatic adjustment using an electric stage, etc. can be used.

It is preferable that the tile correction can be performed at the time of observation or measurement using the white light.

—First Measurement Range Setting Part 8i—

Figure 7E:
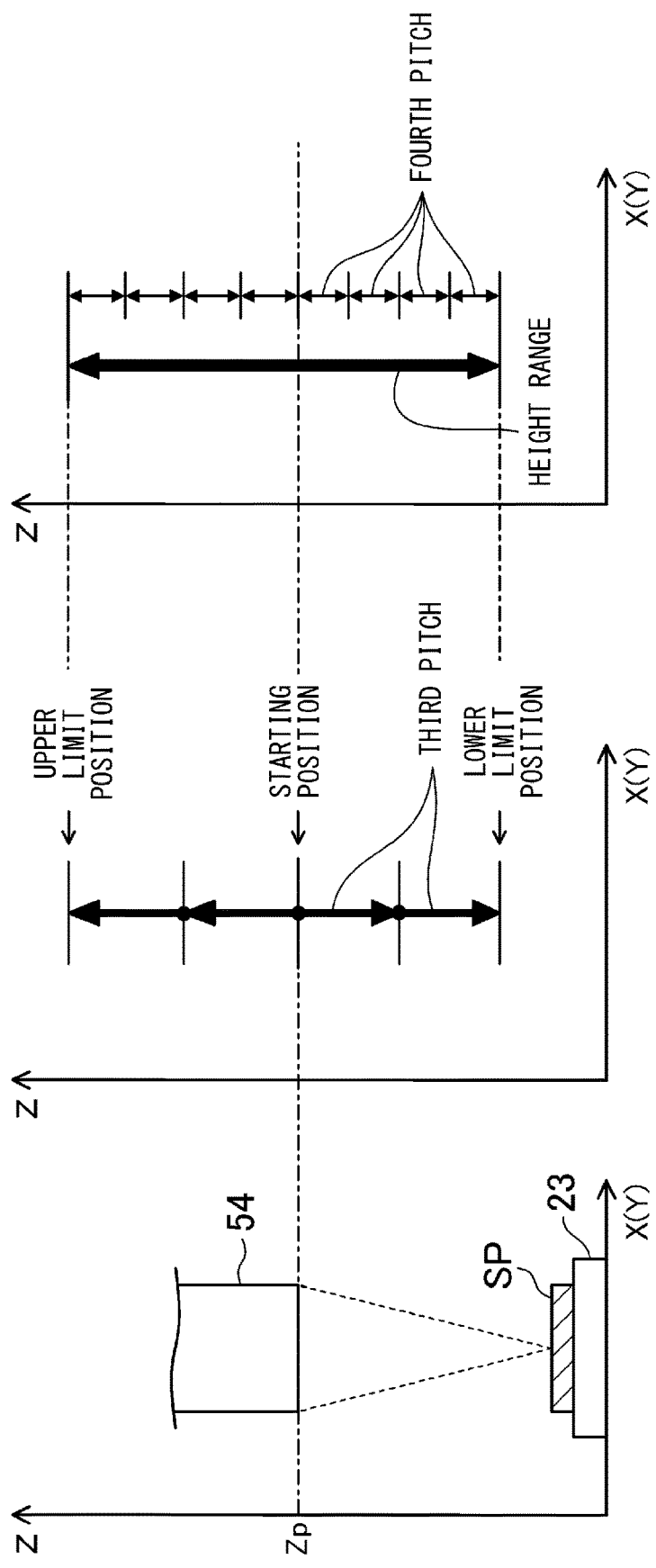
FIG. 7E is a diagram explaining a setting procedure of a height range.

FIG. 7E is a schematic diagram showing a relationship of the focal position Zp, the setting procedure of the height range using the starting position which is set based on the focal position Zp, and the fourth pitch acquired by dividing the set height range in such way.

The measurement of the surface shape can be performed by changing the height position of the stage 23 or the objective lens 54. The range of the height position (hereinafter referred to as "height range") used at this time can be set by using one of the white light interferometry and the laser confocal.

The white light interference microscope 1 according to the present embodiment is provided with the first measurement range setting part 8i setting the height range by using the white light interferometry, and the second measurement range setting part 8j setting the height range by using the laser confocal method.

Here, as shown in FIG. 7E, the height range set by the first measurement range setting part 8i or the second measurement range setting part 8j is set to include at least focal position Zp. That is, the height range is set in a range partitioned at the upper limit position set more than the focal position Zp, and the lower limit position set less than the focal position Zp.

In the present embodiment, the first measurement range setting part 8i or the second measurement range setting part 8j sets the upper limit position after setting the lower limit position, but it is not limited to such setting. The lower limit position may be set after setting the upper limit position.

Further, in the state in which the first measurement range setting part 8i or the second measurement range setting part 8j according to the present embodiment sets the upper limit position and the lower limit position, by dividing the distance between the upper limit position and the lower limit position, in equal interval, each height position of the stage 23 is set when the first measuring part 8k or the second measuring part 8l measures the surface shape of the sample SP.

Note that any one of the first measurement range setting part 8i and the second measurement range setting part 8j may be provided. Further, before the measurement of the surface shape by using the white light interferometry, the second measurement range setting part 8j may set the height range by using the laser confocal method, or before the measurement of the surface shape by using the laser confocal method, the first measurement range setting part 8i may set the height range by using the white light interferometry.

Specifically, after the focal position Zp is calculated by the focal calculation part 8e, in the state that the relative height position of the stage 23 is adjusted by the focus adjustment part 8f (in the state in which the height position is adjusted at the focal position Zp), the first measurement range setting part 8i starts setting the height range based on the interference image taken by the imaging part 58.

Here, the first measurement range setting part 8i generates an interference image via the imaging part 58 in the state that the height position of the stage 23 or the objective lens 54 is changed, and calculates a peak position of the interference fringes from the interference image generated at each height position, and determines whether or not the pixel number successfully calculating the peak position is above the predetermined first threshold within the screen. And, the first measurement range setting part 8i sets the height range as the range above the first threshold (particularly, the range along the Z-direction). The first measurement range setting part 8i is the example of "measurement range setting part" in the present embodiment.

That is, even when the interference fringes are found out from the interference image, when the peak position of the interference fringes occupies very small part within the screen, it is considered that it is inconvenient to perform the measurement by the white light interferometry. Therefore, by performing the setting based on the pixel number successfully calculating the peak position of the interference fringes, the height range can be set more appropriately.

Note that when setting the height range, the number of the pixels configuring the interference image may be reduced in comparison with the case of the measurement of the surface shape. With this, setting the height range can be performed at high speed. Further, the first threshold as an index of the judgement is basically stored in the memory device 82, but it can be appropriately changed based on the operation input, etc. from the external part.

Further, as shown in FIG. 7E, when the height position of the stage 23 or the objective lens 54 is changed at the time of setting the height range, the first measurement range setting part 8i sets the starting position based on the focal position Zp calculated by the focal calculation part 8e, and moves the stage 23 or the objective lens 54 upward or downward from the starting position in the predetermined Z-pitch (third pitch).

Note that as shown in the center drawing of FIG. 7E, the first measurement range setting part 8i according to the present embodiment is configured to set the focal position Zp as the starting position. However, the present disclosure is not limited to such configuration. For example, the height position changed upward or downward from the focal position Zp along the Z-direction is defined as the starting position (in this case, it becomes starting position focal position Zp), and by moving the stage 23 or the objective lens 54 upward or downward from the starting position in the third pitch, the height position may be changed.

Further, when the first measurement range setting part 8i sets the height range, the distance of the height positions each other of the stage 23 can be set to be wider than the case that the first measuring part 8k measures the surface shape of the sample SP. That is, as shown from the comparison between the third line in FIG. 7A and each drawing in FIG. 7E, when the height range is set (the first measurement range setting part 8i sets the height range), in comparison with the case in which the surface shape is measured (the first measuring part 8k or the second measuring part 8l measures the surface shape of the sample SP), it is permitted that the Z-pitch (third pitch) is more coarsely set. The third pitch which is the Z-pitch used when setting the height range can be coarsely set in the similar manner as the first pitch.

Figure 6E:
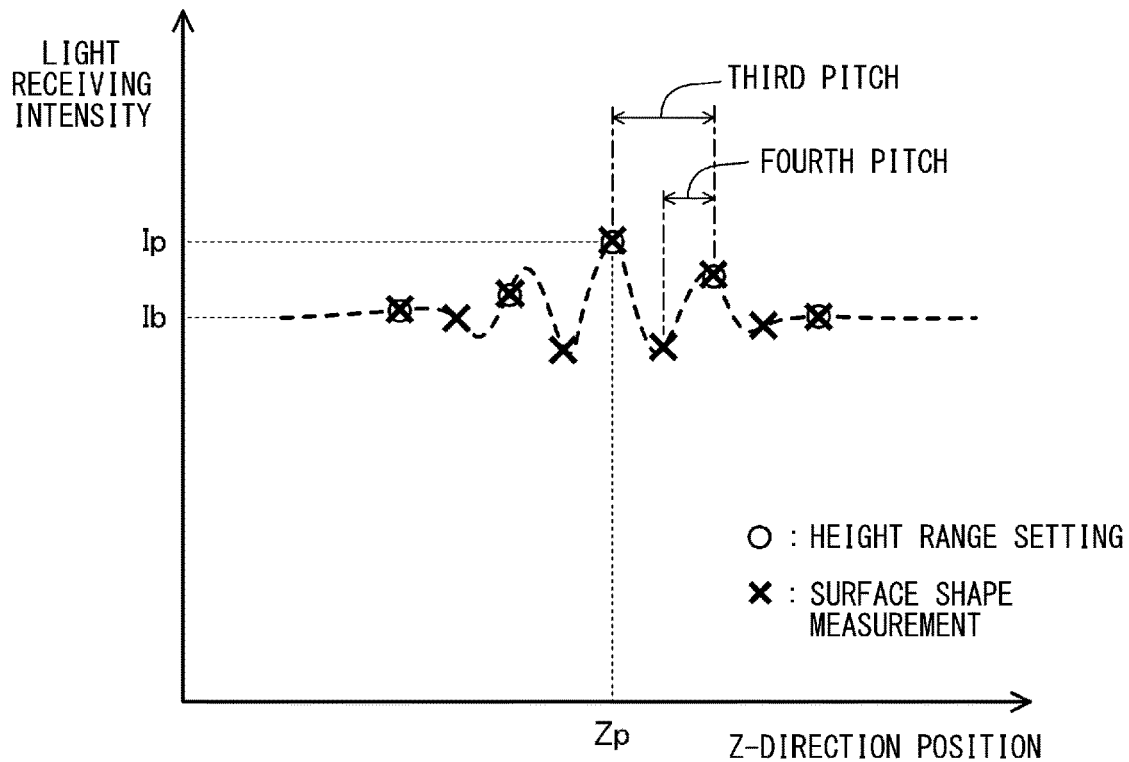
FIG. 6E is a diagram comparing sizes of the third pitch and the fourth pitch.

For example, in FIG. 6E, the white circular shaped plots refer to the height positions used at the time of setting the height range, and the cross-shaped plots refer to the height positions used at the time of the measurement of the aforementioned surface shape. As shown in FIG. 6E, in the similar manner as the aforementioned first pitch, the third pitch according to the present embodiment can be set coarsely in comparison with the Z-pitch (fourth pitch) used when the surface shape is measured.

The height range set by the first measurement range setting part 8i and each height position obtained by dividing the height range are inputted to the first measuring part 8k or the second measuring part 8l.

—Second Measurement Range Setting Part 8j—

On the other hand, after the focal position Zp is calculated by the focal calculation part 8e, in the state that the relative height position of the stage 23 is adjusted by the focus adjustment part 8f (in the state that the height position is adjusted to the focal position Zp), the second measurement range setting part 8j starts setting the height range based on the image (laser image) generated by the light receiving part 66 as the second imaging part.

Here, the second measurement range setting part 8j generates a laser image via the light receiving part 66 in the state that the height position of the stage 23 or the objective lens 54 is changed. Next, the second measurement range setting part 8j generates pixel data in a pixel unit corresponding to the light reception signal generated in the light receiving part 66 about the plurality of pixels during the laser image generated in each height position. And, the second measurement range setting part 8j sets the height range as the range in which all values of the plurality of pixel data are lower than the predetermined second threshold. The second measurement range setting part 8j is the example of "second measurement range setting part" in the present embodiment.

Here, the pixel data is the digital signal obtained by A/D converting the output signal (light reception signal) of the light receiving part 66. Therefore, the pixel data value is larger as the gain of the photodetector 66a becomes larger, and it is smaller as the gain of the photodetector 66a becomes smaller. Further, the pixel data outputs from the A/D converter which is not shown in the drawings.

Further, for example, the second threshold can be the upper limit value (hereinafter referred to as "output upper limit value") of the output range of the A/D converter. When the peak value of the pixel data is smaller than the output upper limit value, the pixel data is not saturated by the output upper limit value. Accordingly, by performing the judgement based on the output upper limit value as the second threshold, the peak value of the pixel data can be easily detected.

Further, when generating the laser image, it is required to scan the laser beam via the scanning control part 8a. In this case, when setting the aforementioned height range, the scanning range Rsc in the first direction and the second direction and the scanning interval (for example, the distance of the illumination positions Ps each other of the laser beam (particularly, each distance of the first direction and the second direction)) may be wider than the case in which the surface shape is measured. With this, the height range can be set in high speed. Further, the second threshold as an index of the judgement is basically stored in the memory device 82, but it can be appropriately changed based on the operation input, etc. from the external part.

Further, at the time of setting the height range, when the height position of the stage 23 or the objective lens 54 is changed, the starting position based on the focal position Zp calculated by the focal calculation part 8e is set, and the stage 23 or the objective lens 54 is moved upward or downward from the starting position in the predetermined Z-pitch (third pitch).

Note that the second measurement range setting part 8j according to the present embodiment is configured to set the focal position Zp as the starting position, but it is not limited to this configuration. For example, the height position changed upward or downward from the focal position Zp is defined as the starting position, and the height position may be changed by moving the stage 23 or the objective lens 54 upward or downward from the starting position in the third pitch.

Further, when the second measurement range setting part 8j sets the height range, each distance of the height positions each other of the stage 23 is set wider in comparison with the case in which the first measuring part 8k measures the surface shape of the sample SP. That is, as shown in FIG. 7A, when the height range is set, in comparison with the case in which the surface shape is measured, it is permitted that the Z-pitch is more coarsely set.

Figure 6F:
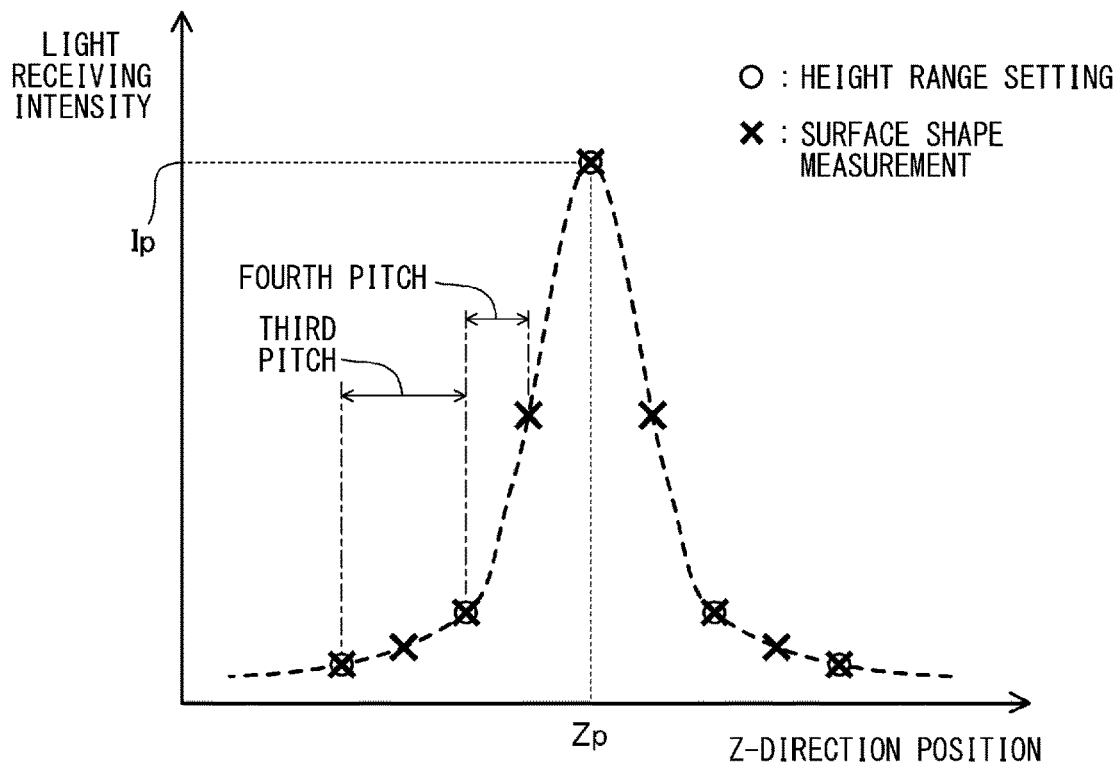
FIG. 6F is a diagram comparing sizes of the third pitch and the fourth pitch.

For example, in FIG. 6F, the white circular shaped plots refer to the height positions used at the time of setting the height range, and the cross-shaped plots refer to the height positions used at the time of the measurement of the aforementioned surface shape. As shown in FIG. 6F, in the similar manner as the aforementioned first pitch, the third pitch according to the present embodiment can be set coarsely (wide) in comparison with the Z-pitch (fourth pitch) used when the surface shape is measured.

Note that regarding the term "third pitch" according to the second measurement range setting part 8j, in order to clarify the technical significance, it is described with the same name as "third pitch" according to the first measurement range setting part 8i, but the name is only used for convenience. That is, it does not have to set the same length in the "third pitch" according to the second measurement range setting part 8j and the "third pitch" according to the first measurement range setting part 8i, and these can be different from each other. The fourth pitch is also the same.

—First Measuring Part 8k—

FIG. 6A is a diagram exemplifying, in one pixel, the relationship of a relative position of the Z-direction of the sample SP, and a light receiving intensity caused by the interference light of the white light. The first measuring part 8k measures the surface shape of the sample SP by using the aforementioned white light interferometry. Specifically, the first measuring part 8k measures the surface shape of the sample SP based on the plurality of interference images taken by the imaging part 58 at the plurality of height positions which is defined within the height range including the focal position Zp.

Note that the surface shape of the sample SP may be called as three-dimensional shape, texture of the sample SP. This is the same as the surface shape measured by the second measuring part 8l.

In detail, by using the principle of the white light interference, the first measuring part 8k acquires an interference image (first image data) which can recognize the surface shape of the sample SP. The first image data is acquired in each imaging range by the imaging part 58. This imaging range is defined according to the magnification, etc. of the objective lens 54.

First, in the state in which the stage 23, eventually, the height position of the sample SP is fixed, the white light is irradiated within the imaging range. In the branching optical system 55 provided inside the interference objective lens Oc, the white light is branched into the reference light reflected by the reference mirror 55b, and the measurement light reflected by the sample SP. Among them, the reflected light of the measurement light is irradiated to the imaging part 58 with the reference light, and received by the image sensor element 58a. The measurement light and the reference light received by the image sensor element 58a generate an interference image overlapping each other. At this time, the light receiving intensity corresponding to the interference image is acquired, and the light receiving intensity is acquired in each pixel of the interference image.

Next, by the Z-direction driving part 71, the height position of the interference objective lens Oc is changed in the predetermined fourth pitch. With this, it becomes the state in which the height position of the interference objective lens Oc is different from previous one, and in the state in which the height position is differentiated, the white light is irradiated to the sample SP. With this, the interference images in which the height position is differentiated are generated. In each pixel of the interference image, the light receiving intensity is monitored. This is repeated in each height position.

At this time, the moving range of the interference objective lens Oc in the Z-direction equals to the height range set by the first measurement range setting part 8i or the second measurement range setting part 8j, and the fourth pitch which is the changing width of the height position equals to the length in which the height range is divided in an equal interval (see FIG. 7E). As described with reference to FIGS. 6D, 6E, and 6F, the fourth pitch can be set finely (narrow) in comparison with both of the first pitch which is the Z-pitch used at the time of the autofocus, and the third pitch which is the Z-pitch used at the time of setting the height range.

The pixel number of the interference image is defined by the pixel number arranged on the light receiving surface of the image sensor element 58a, but both numbers do not have to be matched. From the point of view of the existence or nonexistence of the digital zoom, the reduction of the data size, etc., a part of the pixels configuring the image sensor element 58a may be used for the generation of the interference image.

Further, when the interference images taken over within a wide range are desired, the drive control part 8b controls the XY-direction driving part 73, so that the stage 23 is moved in the X-direction or the Y-direction. And, by irradiating the imaging range different from previous one, the interference images corresponding the imaging range are taken. This processing is performed in each height position, and the first image data is integrally generated by stitching the obtained interference images.

Here, as the example shown in FIG. 6A, when the surface of the sample SP matches with the focus of the interference objective lens Oc (when positioned at the position of the focal position Zp), the measurement light reflected by the surface, and the reference light reflected by the reference mirror 55b enter the image sensor element 58a in the enhancing state each other. As a result, the light receiving intensity is maximized in the image sensor element 58a.

On the other hand, when the surface of the sample SP does not match with the focus of the interference objective lens Oc (when positioned at out of the focal position), while the light receiving intensity in the image sensor element 58a increases and reduces repeatedly, it gradually decreases as distance from the focal position Zp. As a result, the brightness and darkness pattern indicating the interference fringes disappear from the interference image. In other words, only at the vicinity of the focal position Zp, the interference fringes appear in the interference image.

With this, when the surface of the sample Sp matches with the focus of the interference objective lens Oc, the light receiving intensity distribution of the image sensor element 58a reaches a peak (see intensity Ip of FIG. 6A). Further, the light receiving intensity distribution converges the value caused by the reference light as the flare components as distance from the focal position (see intensity Ib of FIG. 6A). Based on the interference images as the second image data, the curve line (Z-I curve) indicating the change of the light receiving intensity with respect to the Z-direction can be obtained in each pixel.

By acquiring the data in each pixel indicating a peak position of the light receiving intensity (Z-direction position, Z-coordinate), the information (height information) indicating a distance between the surface of the sample SP and the interference objective lens Oc can be obtained in each pixel. Based on the height information, the surface shape of the sample SP can be measured.

Here, "when the focus does not match" means that the luminance difference between the adjacent pixels disappears (the luminance ratio approaches 1), and on the other hand, "when the focus matches" means the state in which the luminance difference (luminance ratio) between the adjacent pixels is larger than the case in which it is out of focus.

Further, at the time of actual measurement, the interference objective lens Oc is moved in the Z-direction, and by analyzing the contrast change of the interference fringes, the phrase change, etc. appearing at the time, the data indicating unevenness, etc. of the surface of the sample SP, etc. can be obtained.

The first image data generated by the first measuring part 8k is displayed on the display part 41 by the display control part 8c. The user can recognize the surface shape of the sample SP by viewing the displayed first image data.

—Second Measuring Part 8l—

FIG. 6B is a diagram exemplifying, in one pixel, the relationship of a relative position of the Z-direction of the sample SP, and a light receiving intensity caused by the reflected light of the laser beam. The second measuring part 8l measures the surface shape of the sample SP by using the aforementioned laser confocal method. Specifically, the second measuring part 8l measures the surface shape of the sample SP based on the light receiving intensity of the reflected light of the laser beam scanned by controlling the laser beam scanning part 63 by the scanning control part 8a.

In detail, the second measuring part 8l obtains laser images (second image data) which can recognize the surface shape of the sample SP by using the principle of the laser confocal. This second image data is obtained in each unit area on the sample SP. This unit area is defined depending on the magnification, etc. of the objective lens 54. The second image data in each unit area is generated based on the aforementioned pixel data.

First, in the state in which the stage 23, eventually, the height position of the sample SP is fixed, the laser beam is scanned in the X-direction within the unit area by the laser beam scanning part 63. When completing the scanning of the X-direction, the illumination position of the laser beam moves a regular interval in the Y-direction by the laser beam scanning part 63. After the movement, the laser beam scans in the X-direction. By repeating the scanning of the X-direction of the laser beam within the unit area and the movement of the Y-direction, the scanning of the X-direction and the Y-direction within the unit area is completed.

In this case, the reflected light of the laser beam which is two-dimensionally scanned is irradiated to the light receiving part 66 via the confocal optical system (laser optical system 6) provided with the pinhole 65a, etc.

Next, the height position of the objective lens 54 is changed by the Z-direction driving part 71. With this, it becomes the state in which the height position of the objective lens 54 is different from the previous one, and in the differentiating state of the height position, the scanning of the X-direction and Y-direction of the unit area is performed. After that, the height position of the objective lens 54 is moved in a predetermined pitch (fourth pitch), and the scanning of the X-direction and the Y-direction of the unit area is performed. This processing is repeated in each unit area. As already discussed, the fourth pitch can be set more finely (narrower) than the Z-pitch (first pitch) used at the time of autofocus, and the Z-pitch (third pitch) used at the time of setting the height range (see the third line of FIGS. 6D to 6F, and FIG. 7A).

The pixel number of the X-direction of the second image data is defined by the scanning speed of the X-direction of the laser beam by the laser beam scanning part 63, and the sampling cycle. The sampling number in a single X-direction scanning (one scanning line) becomes the pixel number of the X-direction. Further, the pixel number of the Y-direction is defined by the shift amount of the Y-direction of the laser beam by the laser beam scanning part 63 in each completion of the scanning of the X-direction. The number of scanning lines in the Y-direction is the pixel number of the Y-direction.

When completing the scanning of the X-direction and the Y-direction of the unit area, by controlling the XY-direction driving part 73 by the drive control part 8b, the stage 23 is moved in the X-direction or the Y-direction. And, in another unit area different from the previous one, the scanning of the X-direction and the Y-direction is performed in the same manner. These processes are repeated, and the scanning of the X-direction and the Y-direction for the plurality of unit areas is performed. By connecting the second image data obtained in each unit area, it can be the integrated second image data.

Here, as described with reference to FIG. 6B, when the surface of the sample SP matches with the focus of the objective lens 54 (at the time of the focal position Zp), the reflected light reflected by the surface is incident to the photodetector 66a in the state converged at the periphery of the pinhole 65a. As a result, the light receiving intensity in the photodetector 66a becomes maximum.

On the other hand, when the surface of the sample SP matches with the focus of the objective lens 54 (at the time of positioning at out of focal position), the reflected light reflected by the surface is incident to the photodetector 66a in the state in which the most part is shielded by the pinhole 65a. As a result, the light receiving intensity in the photodetector 66a becomes substantially smaller than the focal position Zp.

With this, when the surface of the sample SP matches with the focus of the objective lens 54, the light receiving intensity distribution of the photodetector 66a appears a steep peak (see intensity Ip of FIG. 6B). Based on the first image data in each unit area, a curve line (Z-I curve) indicating the change of the light receiving intensity with respect to the Z-direction can be obtained in each pixel.

By obtaining data indicating the peak position of the light receiving intensity (position in the Z-direction, Z-coordinate) in each pixel, the information (height information) indicating the distance between the surface of the sample SP and the objective lens 54 can be obtained in each pixel. By arranging the height information according to the arrangement of each pixel, the second image data capable of recognizing the surface shape of the sample SP is generated.

The second image data generated by the second measuring part 8l is displayed by the display control part 8c in the display part 41. The user can recognize the surface shape of the sample SP by viewing the displayed second image data.

<Concrete Example of Measurement Procedure>
—Basic Flow—

Figure 8:
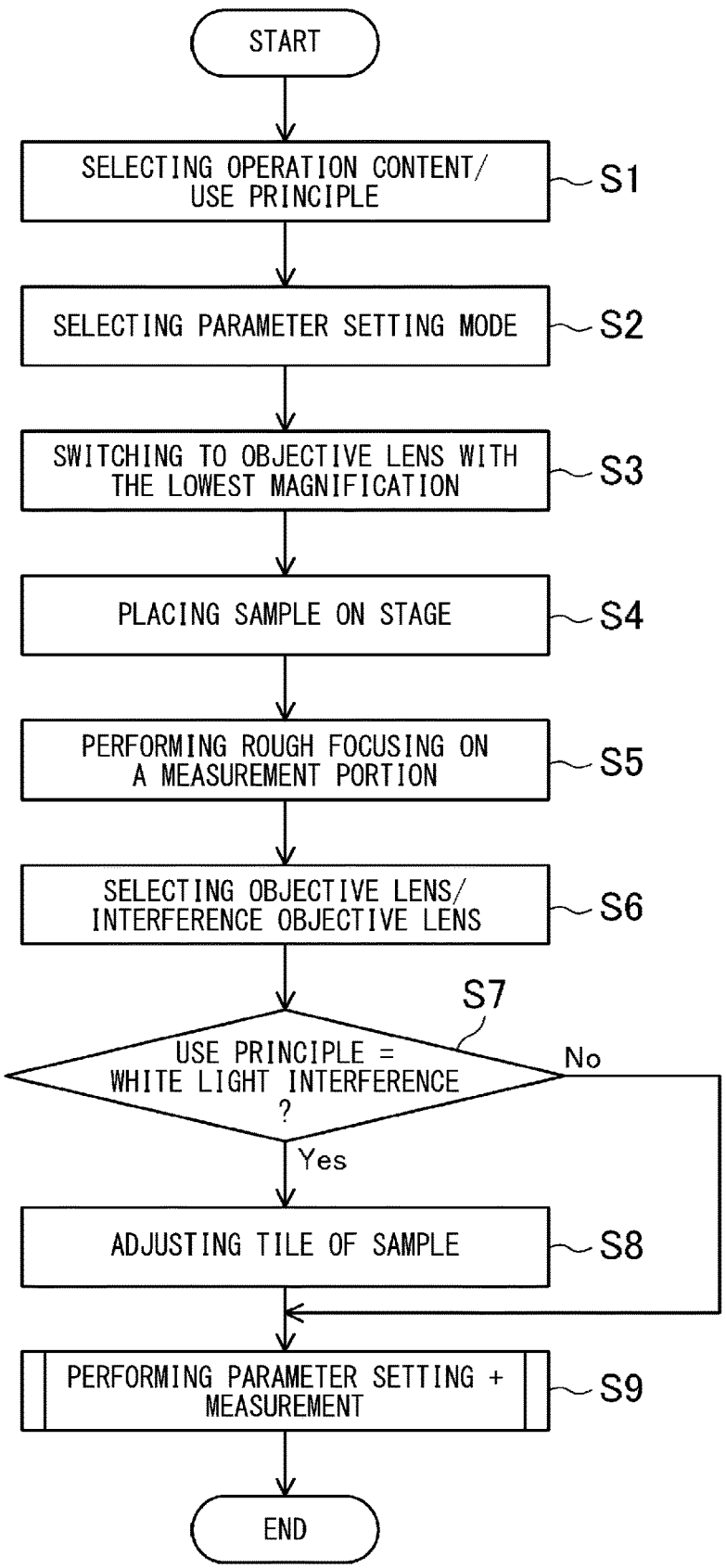
FIG. 8 is a flowchart exemplifying a basic use procedure of the white light interference microscope.

FIG. 8 is a flowchart exemplifying the measurement procedure of the sample SP by the white light interference microscope 1. First, when the white light interference microscope 1 is started, in Step S1, an operation content (operation mode) of the white light interference microscope 1 and a use principle used at time of the operation are selected.

Here, the operation mode corresponds to the first mode which measures the surface shape of the sample SP, the second mode which measures a film thickness of the sample SP (the detail is omitted), and the third mode which observes the sample SP. The user selects the operation content which should be performed in the white light interference microscope 1 by performing a click operation, etc. to the screen displayed on the display part 41. The mode switching part 8d displays the screen corresponding to the operation content selected by the user on the display part 41.

As described below, the screen displayed on the display part 41 shows various information such as the laser image, the interference image, the measurement result of the surface shape, etc. to the user, and on the other hand, it functions as a user interface (User Interface: UI) to receive the operation inputs of the keyboard 42, mouse 43, etc.

Further, the use principle capable of being selected in Step S1 includes at least the white light interferometry and the laser confocal method. Other than that, other principles such as focus synthesizing, etc. may be selected by the user.

Next, in Step S2, by operating the aforementioned screen by the user, a setting mode of the parameter used for each operation mode is selected. The white light interference microscope 1 according to the present embodiment can perform, as the setting mode of the parameter, an automatic setting mode (also called as "easy setting") in which the user control system 8 automatically sets the parameter, a manual setting mode (also called as "basic setting") in which the user himself/herself sets the parameter by operating the keyboard 42, etc. The mode switching part 8d displays the information corresponding to the setting mode selected by the user on the display part 41.

Next, in Step S3, among the plurality of objective lenses 54 mounted to the electric revolver 74, it switches to the objective lens 54 with the lowest magnification. As soon as the setting mode is selected, this switching operation may be automatically performed by the drive control part 8b or may be manually performed by the user.

Next, in Step S4, the sample SP is placed on the stage 23.

Note that the order of the aforementioned Steps S1 to S4 is not limited to the aforementioned flow. For example, the order of Step S1 and Step S2 may be reversed, or Step 4 may be performed at the earlier timing before Step S1. The flow shown in FIG. 8 is just an example.

Next, in Step S5, the measurement portion on the sample Sp is searched, and the focus is roughly adjusted on the measurement portion (rough focusing). This focusing may be manually performed by the user, or may be automatically performed by the focus adjustment part 8f, etc.

Next, in Step S6, the objective lens 54 for measurement is selected. This selection is manually performed by the user via the UI displayed on the display part 41.

Here, when the white light interferometry is selected in Step S1, as the objective lens 54, the interference objective lens Oc configured by combining the objective lens 54 and the branching optical system 55 is selected. However, in the present disclosure, it is not limited to such configuration. As described above, even when the measurement is performed by the white light interferometry, before such measurement, it is configured to perform the autofocus by the laser confocal method. Therefore, even when the white light interferometry is selected, it may be configured to temporarily select the normal objective lens 54 which does not include the branching optical system 55.

On the other hand, in Step S1, when the laser confocal method is selected, in Step S6, as the objective lens 54, the normal objective lens 54 which does not include the branching optical system 55 is selected.

In Step S6, when the objective lens 54 is selected, the drive control part 8b operates the electric revolver 74, and the front end face of the selected objective lens 54 is faced to the aforementioned measurement portion on the sample SP.

Next, in Step S7, the unit control system 8 judges whether or not the white light interferometry is selected as the user principle. When it judges that the white light interferometry is selected (Step S7: YES), the control process proceeds to Step S8, and the tilt adjustment part 8h adjusts the tilting of the sample SP. On the other hand, when it judges that the laser confocal method is selected (Step S7: NO), Step 8 is skipped, and the control process proceeds to Step S9. Note that even when the laser confocal method is selected, the tilting adjustment by the tilt adjustment part 8h may be performed.

Next, in Step S9, based on the selection in Step S1 and Step S2, the setting of various parameters, the measurement of the surface shape of the sample SP, etc. are performed. Hereinafter, only the case in which the first mode (operation mode for measuring the surface shape of the sample SP) is selected will be described.

—Concrete Example of User Interface—

Figure 15:
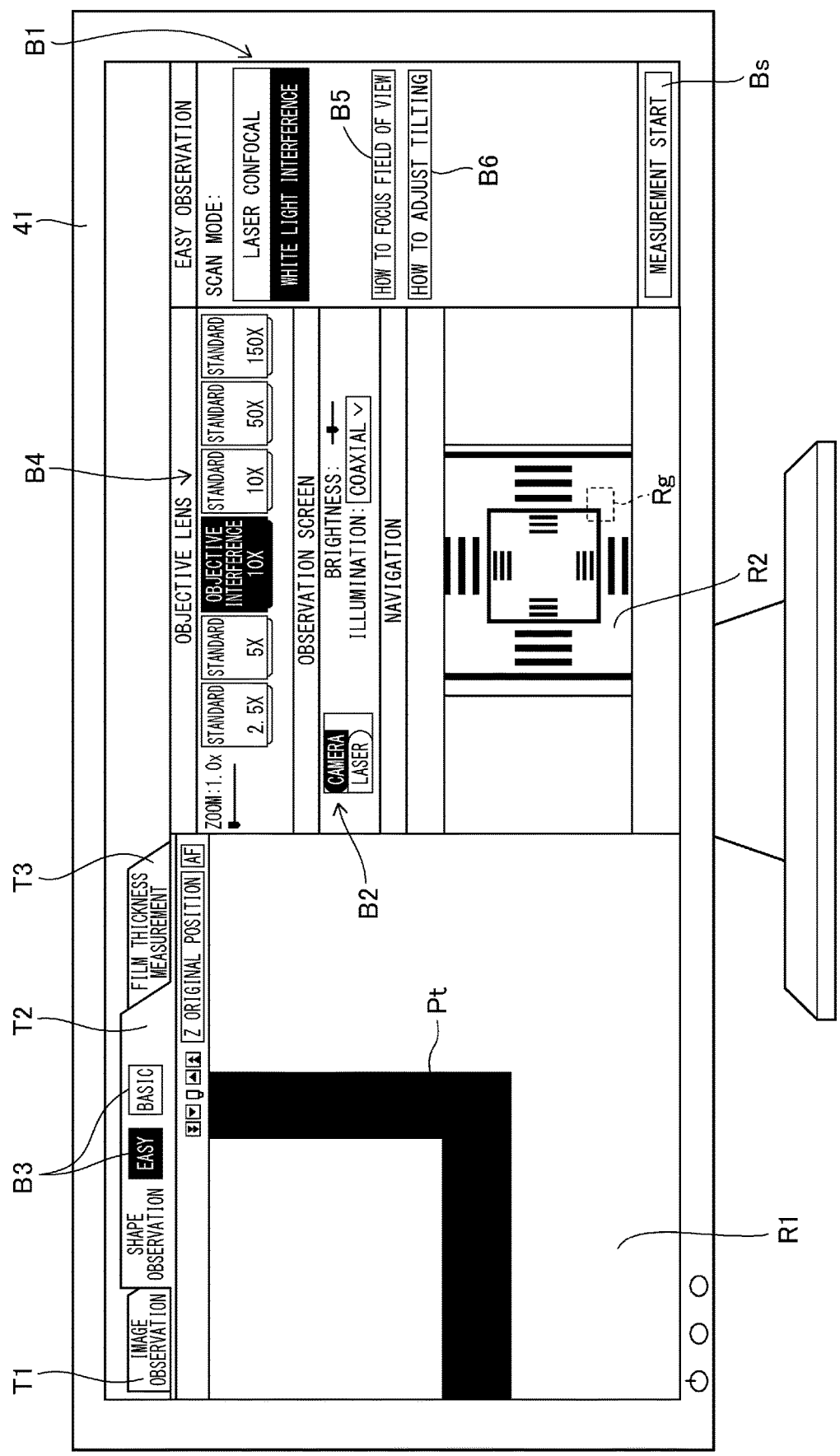
FIG. 15 is a diagram exemplifying a display screen at the time of easy setting.
Figure 16:
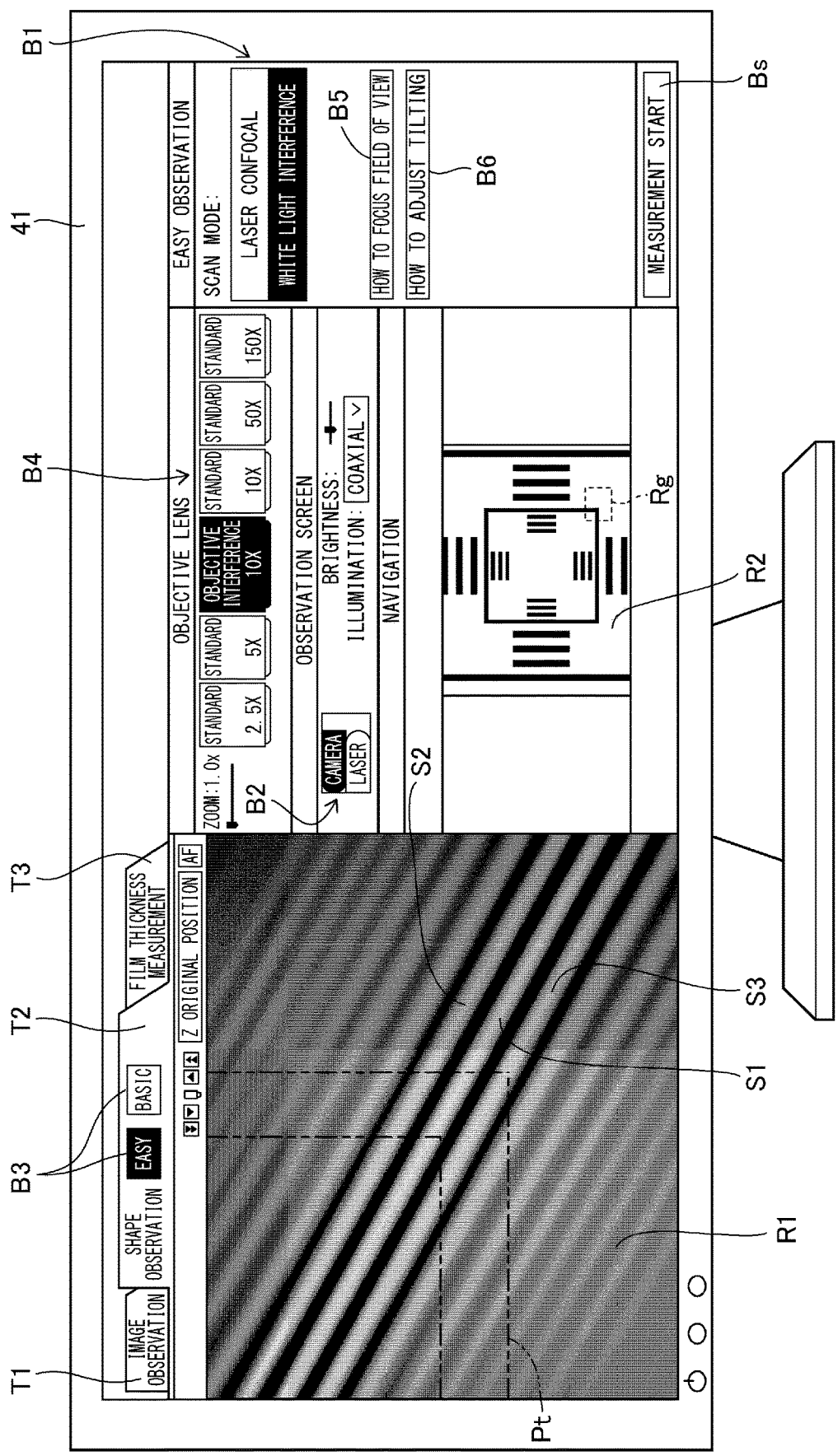
FIG. 16 is a diagram exemplifying a display screen at the time of measuring by the white light interferometry.
Figure 17:
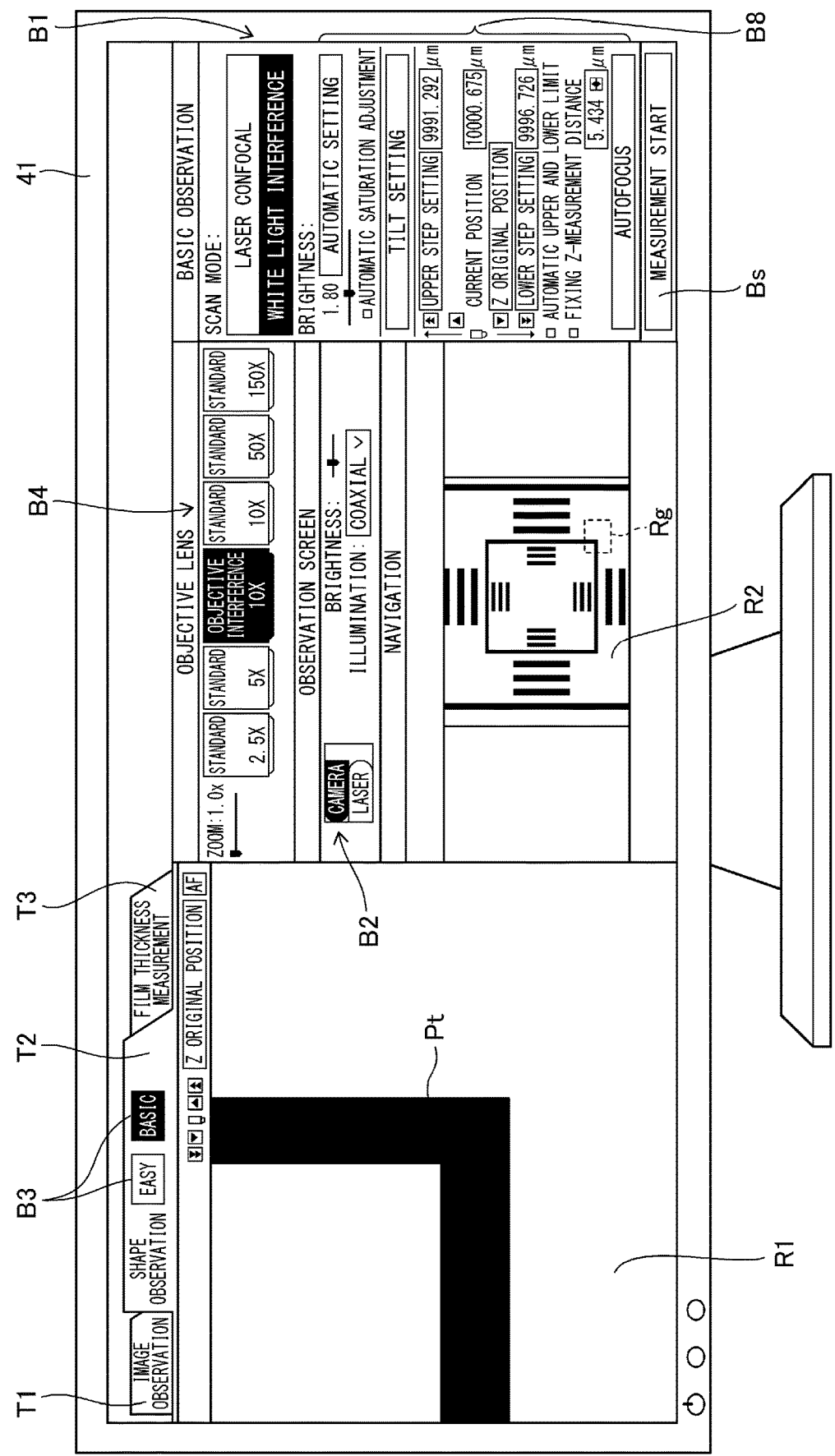
FIG. 17 is a diagram exemplifying a display screen at the time of the basic setting.

FIGS. 15 to 17 are diagrams showing concrete examples of UI displayed on the display part 41.

Specifically, FIG. 15 is a diagram exemplifying the display screen at the time of easy setting of various parameters. Further, FIG. 16 is a diagram exemplifying the display screen at the time of the measurement by the white light interferometry, and FIG. 17 is a diagram exemplifying the display screen at the time of the basic setting of various parameters.

Here, the first display area R1 is the area for displaying a partially enlarged surface (observation surface) of the sample SP, and the second display area R2 is the area for displaying the whole surface of the sample SP like bird's eye view.

Further, the rectangular frame Rg displayed inside the second display area R2 is the frame for indicating the area which is enlarged and displayed as the first display area R1. In the example shown in FIG. 15, a part within the marking pattern Pt (particularly, a corner part of rectangular part) is displayed inside the first display area R1.

Here, the button B2 is the UI for selecting a means to obtain an image displayed on the screen. By performing a click operation to the button B2, the camera images taken by the imaging part 58 are displayed on the first and second display areas R1, R2 (camera), and laser images generated by scanning the laser beam on the surface of the sample SP can be displayed on the first and second display areas R1, R2 (laser). In the example figures, it is the state in which the former "camera" is displayed.

Further, around the button B2, when generating the camera images, the UI for the user to select using the white light irradiated from the white light source 51 or using light irradiated from the aforementioned ring-lighting 54a is displayed, and the UI for adjusting the brightness of each light source is displayed. In the example figures, it is the state in which the former white light source 51 is selected (displaying "coaxial" in the drawings).

By starting the white light interference microscope 1, when the first mode is selected as the operation mode, the screen as the example shown in FIG. 15 is displayed. Here, the tabs T1 to T3 are the UI for switching the operation mode of the white light interference microscope 1.

For example, when the tab T1 is clicked, the third mode (operation mode for observing the sample SP) is selected, and when the tab T2 is clicked, the first mode is selected, and when the tab T3 is clicked, the second mode (operation mode for measuring a film thickness of the sample SP) is selected. In any of FIGS. 15 to 17, these figures show the state in which the first mode is selected.

Further, the button B3 is the UI for selecting a setting mode of various parameters. In the drawing example, by clicking the button B3, one of the aforementioned automatic setting mode (easy setting) and the manual setting mode (basic setting) can be selected. Note that in FIG. 15, it is the state in which the automatic setting mode is selected, and in FIG. 17, it is the state in which the manual setting mode is selected.

Further, the button B1 is the UI for selecting the use principle for measurement. As shown in the comparison between FIG. 15 and FIG. 17, the button B1 is displayed in both cases of selecting the automatic setting mode and selecting the manual setting mode. By clicking the button B1, one of the laser confocal method and the white light interferometry can be selected. In the case in which other principles such as focus synthesizing, etc., can be performed, around the button B1, a button for selecting another principle is additionally displayed. In the example figure, it is the state in which the white light interferometry is selected.

Further, the button B4 is the UI for selecting the objective lens 54 facing the sample SP among the plurality of objective lenses 54. In the example figures, it shows the state in which five objective lenses 54, which are appropriate for the laser confocal method, and one interference objective lens Oc, which is appropriate for the white light interferometry, are arranged in line. By clicking one of these buttons, the objective lens 54 is selected. In the example figures, it shows the state in which the interference objective lens Oc is selected.

Other than that, when the automatic setting mode is selected, a button B5 for guiding how to focus a field of view, and a button B6 for guiding a tilting adjustment are displayed on the screen, and when the manual setting mode is selected, a button group B8 for manually adjusting various parameters is displayed on the screen.

Further, when the measurement start button Bs arranged at the lower right of the screen of FIGS. 15 to 17 is pressed down, the measurement of the surface shape of the sample SP starts. A timing for pressing down the measurement start button Bs will be described later.

—Concrete Example of Various Processes—

Figure 9:
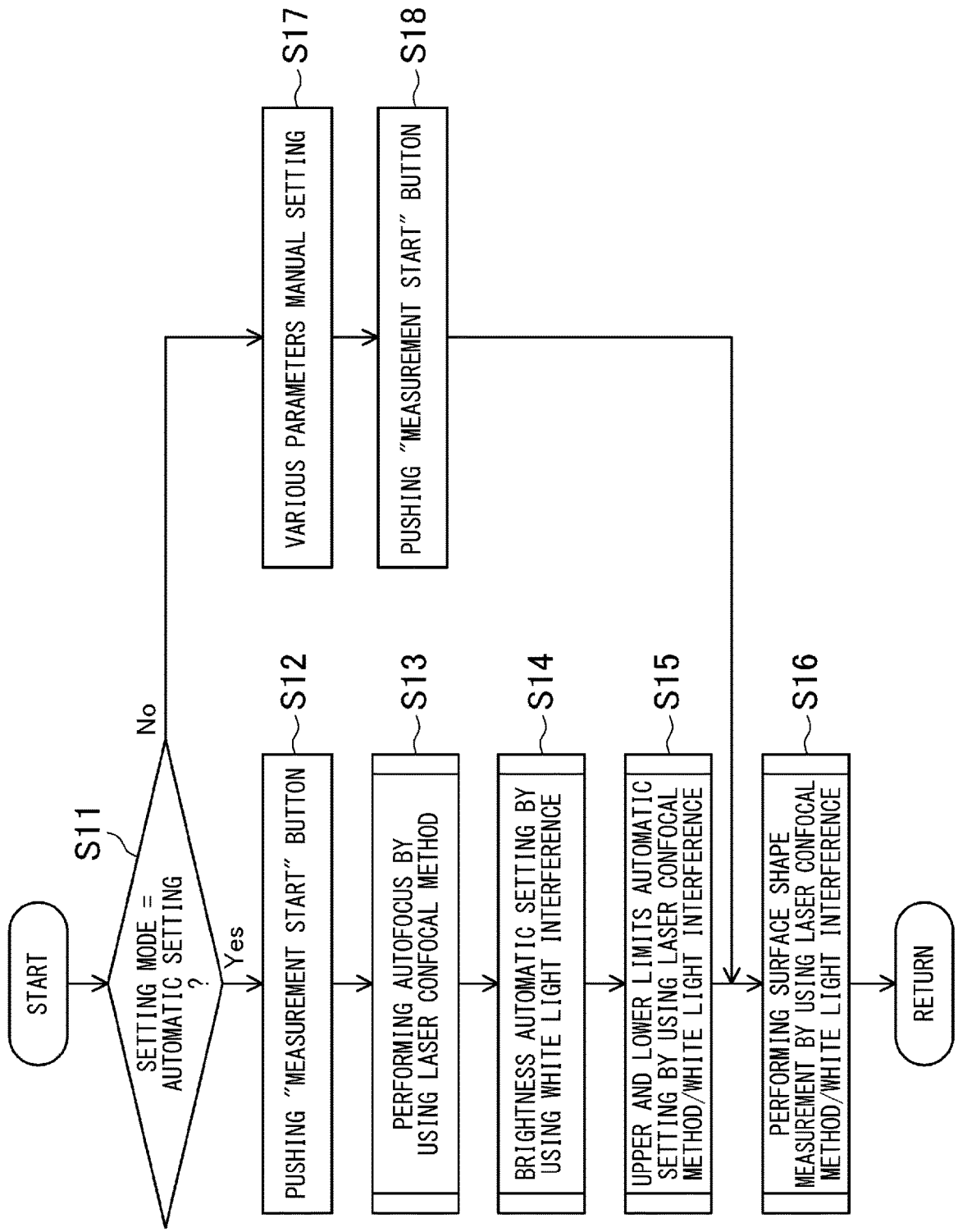
FIG. 9 is a flowchart exemplifying a parameter setting procedure by the white light interference microscope.

Hereinafter, the process according to the setting of various parameters, and the process according to the measurement based on the set parameters will be described in the order. FIG. 9 is a flowchart exemplifying the setting procedure of parameters in the white light interference microscope. Steps S11 to S18 shown in FIG. 9 is the example of the detail of the process shown in Step S9 of FIG. 8.

First, in Step S11 of FIG. 9, as the setting mode of the parameters, it judges whether or not the setting mode is selected. This judgement may be performed by, for example, the mode switching part 8d.

When it judges that the automatic setting mode is selected (Step S11: YES), the control process proceeds from Step S11 to Step S12. In this case, as soon as the measurement start button Bs in the example shown FIG. 15, etc. is pressed down, the unit control system 8 performs the automatic setting of the various parameters, and continuously performs the measurement based on the parameters which are automatically set.

On the other hand, when it judges that the automatic setting mode is not selected (Step S11: NO), the control process proceeds from Step S11 to Step S17. In this case, in Step S17, the button group B8 in the example shown in FIG. 17 is operated by the user, and various parameters are manually selected. Then, when the measurement start button Bs is pressed down in Step S18, in Step S16, the measurement of the surface shape using the white light interferometry or the laser confocal method is performed and it is returned.

When returning to Step S12, when the measurement start button Bs is pressed down in the same step, the control process proceeds from Step S12 to Step S13. In Step S13, regardless of the principle used for the measurement of the surface shape, the autofocus (automatically focusing) using the laser confocal method is performed.

Figure 10:
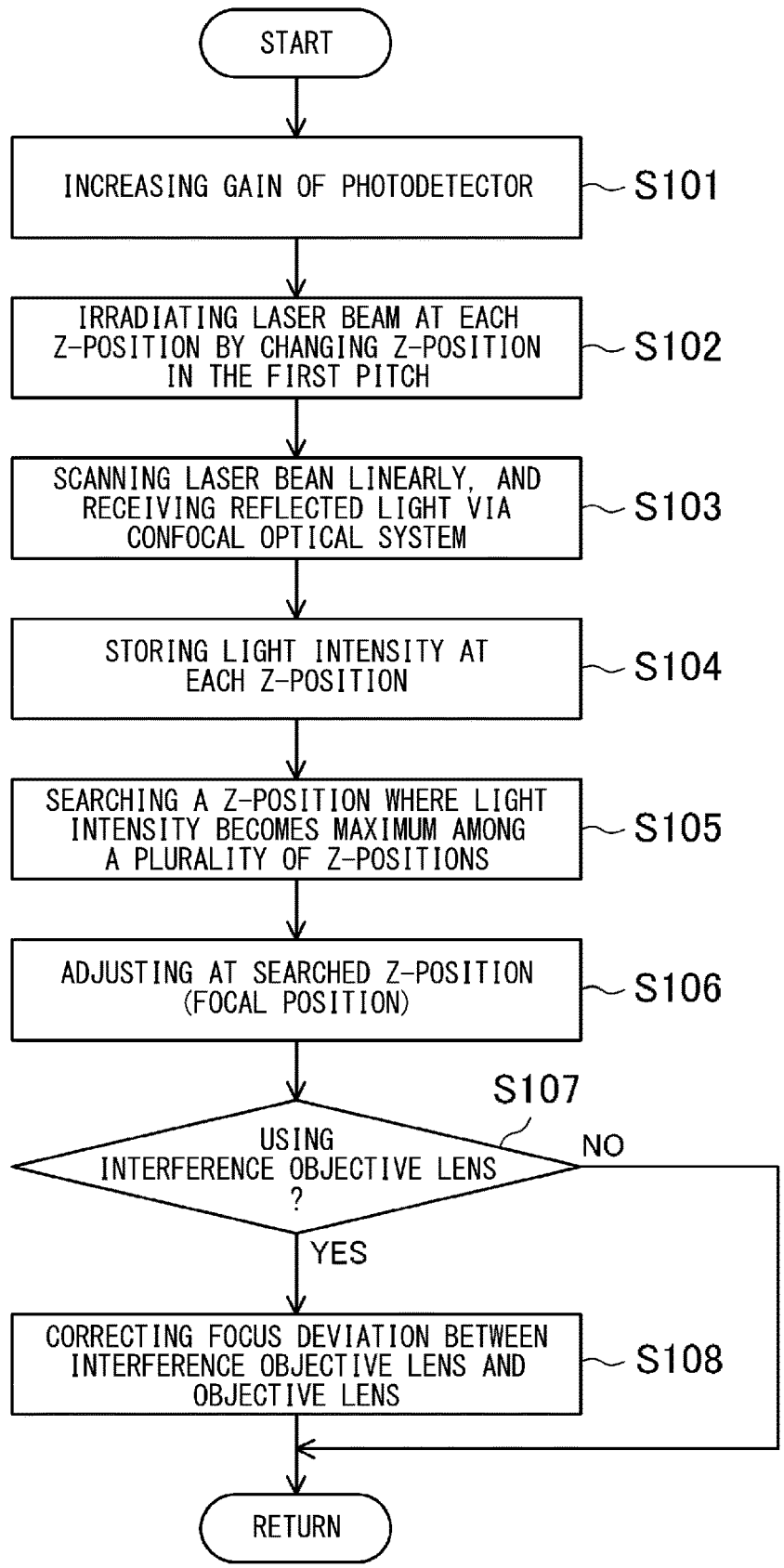
FIG. 10 is a flowchart exemplifying an autofocus performing procedure by the white light interference microscope.

FIG. 10 is a diagram exemplifying the concrete process performed in Step S13 of FIG. 9. That is, FIG. 10 is the flowchart exemplifying the actual procedure of the autofocus in the white light interference microscope 1.

First, in Step S101 of FIG. 10, the gain of the photodetector 66a temporarily increases. With this, when irradiating the laser beam to the sample SP, it is possible to more surely capture the reflected light corresponding to the focal position Zp. In the case of the autofocus using the laser confocal method, even when it is out of the focal position Zp, it is permitted to significantly enhance the gain of the photodetector 66a.

Next, in Step S102, by controlling the Z-direction driving part 71 by the drive control part 8b, the relative height (Z-position) of the stage 23 with respect to the objective lens 54 changes in the predetermined first pitch. And, by controlling the laser light source 61 by the unit control system 8, the laser beam is irradiated to the sample SP at each Z position. As described above, the first pitch is coarsely set in comparison with the Z-pitch (fourth pitch) used at the time of the measurement by the laser confocal method (see FIG. 7A).

Next, in Step S103, the scanning control part 8a controls the laser beam scanning part 63 so as to linearly scan the laser beam for the number of columns along the X-direction. That is, for the X-direction, approximately whole area is scanned, and on the other hand, for the Y-direction, only few pixels are scanned. The reflected light of such scanned laser beam is directed to the photodetector 66a via the laser optical system 6 (confocal optical system) configured with the pinhole 65a, etc. As described above, when the focus of the objective lens 54 matches with the surface of the sample SP, it reaches to the photodetector 66a, and on the other hand, when it does not match, it is shielded by the pinhole 65a.

Next, in Step S104, the memory device 82 stores the light receiving intensity at each Z-position.

Next, in Step S105, among the plurality of Z-positions, the focal calculation part 8e searches the Z-position (focal position Zp) in which the light receiving intensity becomes maximum. As already described, it is possible to perform the search of the focal position Zp by fitting the light receiving intensity stored in association with each Z-position by using a parabolic curve, a Gaussian function, etc.

Next, in Step S106, by controlling the Z-direction driving part 71 by the focus adjustment part 8f, in order to realize the focal position Zp searched in the aforementioned Step S105, the height position of the stage 23 or the objective lens 54 is adjusted. With this, the focusing of the objective lens 54 is completed (the autofocus is completed).

Note that in the case of well-known structure, it is assumed that the autofocus using the laser confocal method is performed by using a normal objective lens 54. However, as described above, instead of the normal objective lens 54, the white light interference microscope 1 according to the present embodiment can perform the autofocus in the state in which the interference objective lens Oc is selected. A deviation caused by the optical characteristic (particularly, chromatic aberration) of the optical component of lens, etc. and the wavelength of the light passing through each optical component together exists between the focal position Zp obtained by using the normal objective lens 54 and the focal position Zp obtained by using the interference objective lens Oc.

In other words, the deviation of the focal position Zp is not changed based on the measurement degrees such as the laser characteristics, the layout of the scanning area, the unevenness of the sample SP, etc. of the sample SP, but it just depends on the optical characteristic of the lens. Accordingly, the deviation of the focal position Zp is measured in advance, and it can be stored in the memory device 82. When the focal position Zp is measured by using the interference objective lens Oc, the white light interference microscope 1 according to the present embodiment is configured to correct the deviation of the focal position Zp based on the memory content of the memory device 82.

Specifically, in Step S107 continued from Step S106, in the unit control system 8, when the focal calculation part 8e calculates the focal position Zp, it judges whether or not the interference objective lens Oc is used. And, when it judges that the interference objective lens Oc is used (Step S107: YES), the control process proceeds to Step S108. In this case, the focal position Zp is corrected for the deviation stored in the memory device 82. On the other hand, when it judges that the interference objective lens Oc is not used (Step S107: NO), the control process skips Step S108 and returns.

Figure 11:
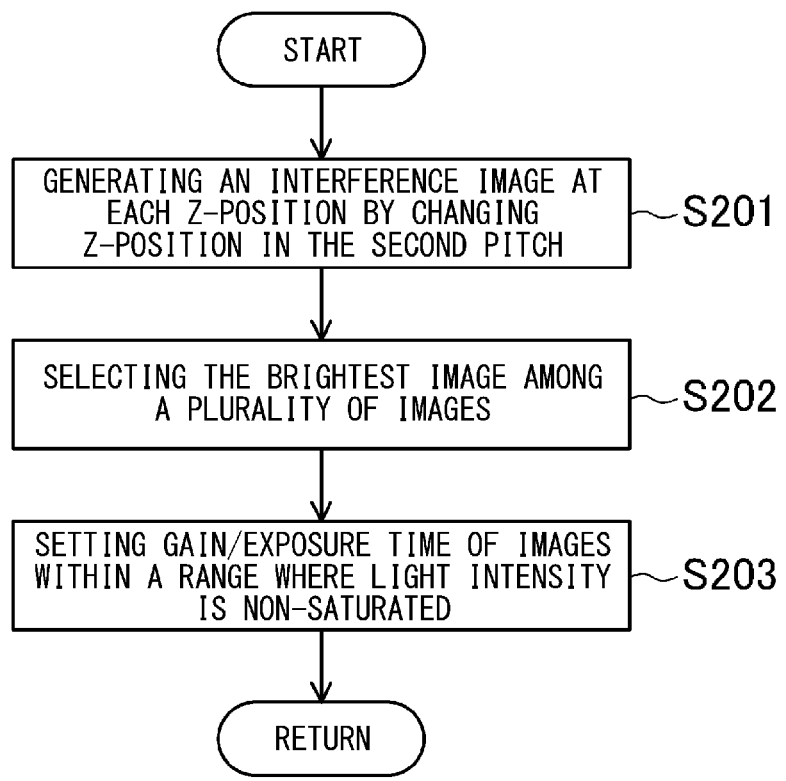
FIG. 11 is a flowchart exemplifying a brightness adjustment performing procedure after the autofocus was performed.

When the flow shown in FIG. 10 is completed, the control process proceeds from Step 13 to Step S14. FIG. 11 is a diagram exemplifying the concrete process performed in Step S14 of FIG. 9. That is, FIG. 11 is a flowchart exemplifying the actual procedure of the brightness adjustment after the autofocus.

Note that Step S14 of FIG. 9 and the flow shown in FIG. 11 are the processes performed when the surface shape of the sample SP is measured by using the white light interferometry. For example, when the laser confocal method is selected as the use principle for measurement, these processes are not performed and skipped.

First, in Step S201 of FIG. 11, the drive control part 8b controls the Z-direction driving part 71, so that the relative height position (Z-position) of the stage 23 with respect to the objective lens 54 is changed in the predetermined second pitch. As described above, the size of the second pitch does not depend on the numerical aperture, etc. of the objective lens 54 and it is determined based on the wavelength of the white light. Further, the initial position when changing the height position may be the focal position Zp, or it may be another height position set based on the focal position Zp.

In any cases, the focal position Zp is searched in advance to the brightness adjustment, so that the brightness of the white light can be adjusted in the state of being focused to some extent. With this, the saturation of the light receiving intensity can be suppressed. The process exemplified in FIG. 11 has an effective from the point of view that the autofocus by the laser confocal method and the shape measurement by the white light interferometry are smoothly connected.

And, the unit control system 8 controls the white light source 51, so that the white light is irradiated to the sample SP at each Z-position. By irradiating the white light, the interference image in association with each Z-position can be taken. In the present embodiment, taking interference images is performed at each Z-position where the objective lens 54 is raised twice in the second pitch from the focal position Zp as the initial position, and each Z-position where the objective lens 54 is lowered twice in the second pitch from the focal position Zp.

Next, in Step S202, the brightness adjustment part 8g selects an interference image including the brightest pixel among the plurality of interference images taken at each Z-position. This selection can be performed by analyzing the light receiving intensity (luminance) in each pixel.

Next, in Step S203, for the interference image selected in Step S203, the brightness adjustment part 8g sets the gain and the exposure time of the interference image within the range where the light receiving intensity of each pixel is not saturated. The parameters set in Step S203 are used at the time of measurement used for the white light interferometry.

Figure 12:
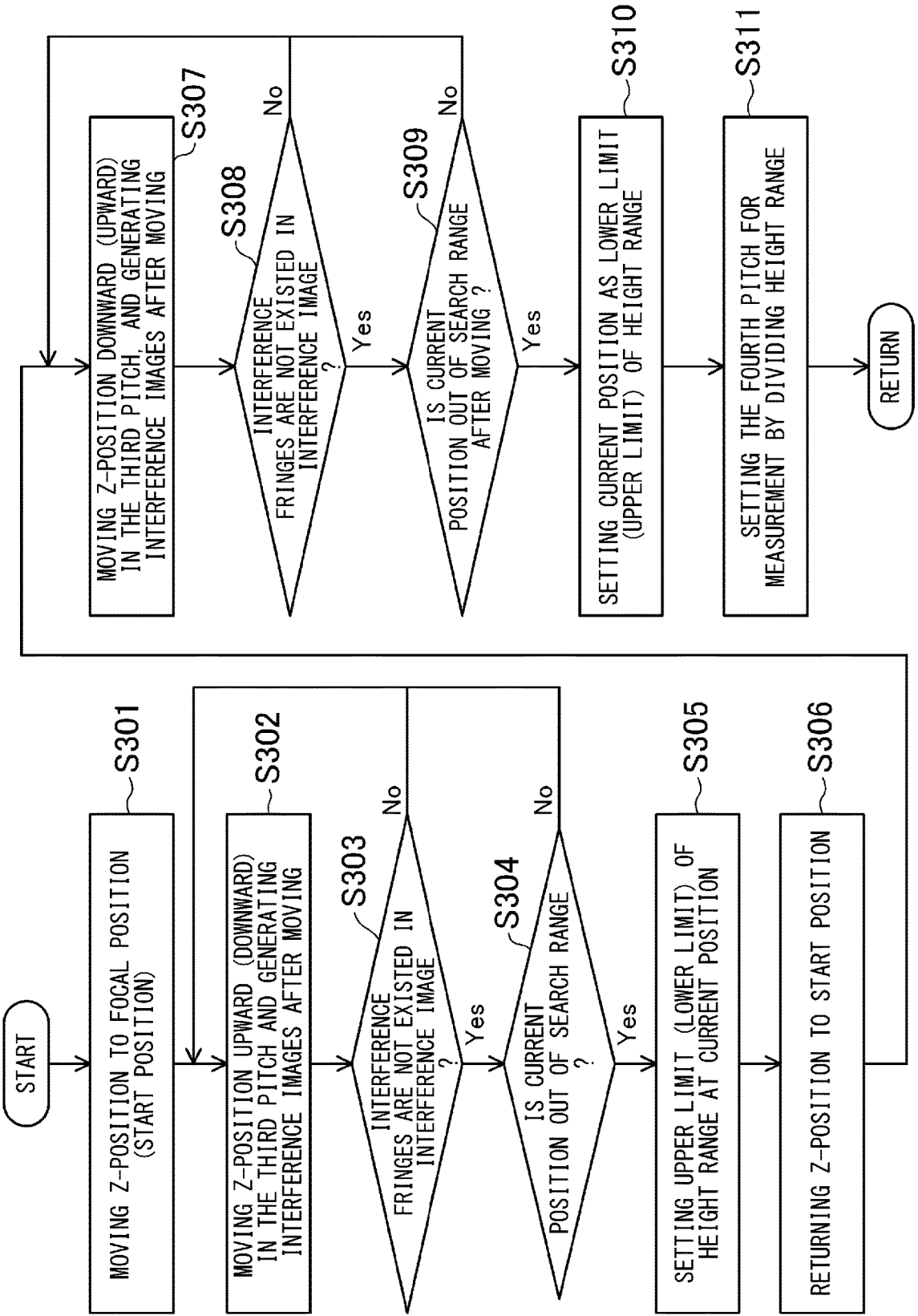
FIG. 12 is a flowchart exemplifying a height range setting procedure by using the white light interferometry.

When the flow shown in FIG. 11 is completed, the control process proceeds from Step S14 to Step S15. FIG. 12 is a diagram exemplifying the concrete processing performed in Step S15. That is, FIG. 12 is a flowchart exemplifying the setting procedure of the height range using the white light interferometry.

First, in Step S301 of FIG. 12, the first measurement range setting part 8i controls the Z-direction driving part 71 via the drive control part 8b, so that the relative height position (Z-position) of the stage 23 with respect to the objective lens 54 is moved to the predetermined starting position. This starting position may be the focal position Zp or may be another height position which is set based on the focal position Zp. Here, it is exemplified in the case in which the starting position is the focal position Zp.

Next, in Step S302, the first measurement range setting part 8i controls the Z-direction driving part 71 via the drive control part 8b, so that the Z-position of the objective lens 54 is upwardly moved in the predetermined third pitch from the starting position which is moved in Step S301 (it is moved in the manner expanding the distance between the stage 23 and the objective lens 54). And, at each Z-position moved every third pitch, the first measurement range setting part 8i performs the generation of the interference images by the white light optical system 5. As described above, the third pitch is coarsely set in comparison with the Z-pitch (fourth pitch) used at the time of the measurement by the laser confocal method (see FIG. 7A).

As described above, when the interference fringes are not existed in the interference image, it is out of focus, and it is considered that the Z-position is inappropriate for the use of the white light interferometry and the laser confocal method. In other words, by searching the Z-position where the interference fringes disappear from the interference image, it can be the boundary of the height range used for the measurement of the surface shape.

Specifically, in Step S303, the first measurement range setting part 8i calculates a peak position of the interference fringes from the interference image generated in Step S302, and judges whether or not the pixel number which successfully calculates the peak position is lower than the predetermined first threshold within the screen. The control process proceeds to Step S304 when the judgement of Step S303 is YES (e.g., when the interference fringes are not existed in the interference image), and on the other hand, when it is NO, it returns to Step S302.

Next, in Step S304, the first measurement range setting part 8i judges whether or not the current Z-position is out from the predetermined search range, and when the judgement is YES (when it is out of the search range), it proceeds to Step S305, and on the other hand, when it is NO (when it is in the search range), in order to take the images within the search range without missing, it returns to Step S302.

Next, in Step S305, the first measurement range setting part 8i sets the current Z-position as the upper limit position of the height range. The first measurement range setting part 8i stores the set upper limit position in the memory device 82.

Next, in Step S306, the first measurement range setting part 8i controls the Z-direction driving part 71 via the drive control part 8b, so that the Z-position is returned to the starting position (focal position Zp).

Next, in Step S307, the first measurement range setting part 8i controls the Z-direction driving part 71 via the drive control part 8b, so that the Z-position of the objective lens 54 is moved in the predetermined third pitch from the starting position moved in Step S306, in a manner moving to the opposite direction in Step S302 (it is moved so as to narrow the space between the stage 23 and the objective lens 54). And, at each Z-position moved every third pitch, the first measurement range setting part 8i performs the generation of the interference images by the white light optical system 5.

Next, in Step S308, the first measurement range setting part 8i judges whether or not the interference fringes exist in the interference image generated in Step S307, and when the judgement is YES (when the interference fringes disappear), it proceeds to Step S309, and on the other hand, when it is NO (when the interference fringes exist), it returns to Step S307.

Next in Step S309, the first measurement range setting part 8i judges whether or not the current Z-position is out of the predetermined search range, and when the judgement is YES (when it is out of the search range), it proceeds to Step S310, and on the other hand, when it is NO (when it is within the search range), in order to take the images within the search range without missing, it returns to Step S307.

Next in Step S310, the first measurement range setting part 8i sets the current Z-position as the lower limit position of the height range. The first measurement range setting part 8i stores the set lower limit position.

Next in Step S311, the first measurement range setting part 8i sets the fourth pitch for measurement by dividing the distance between the upper limit position and the lower limit position in equal intervals. As described above, the fourth pitch is set to be narrower than the first pitch for autofocus and the third pitch for setting the height range.

Figure 13:
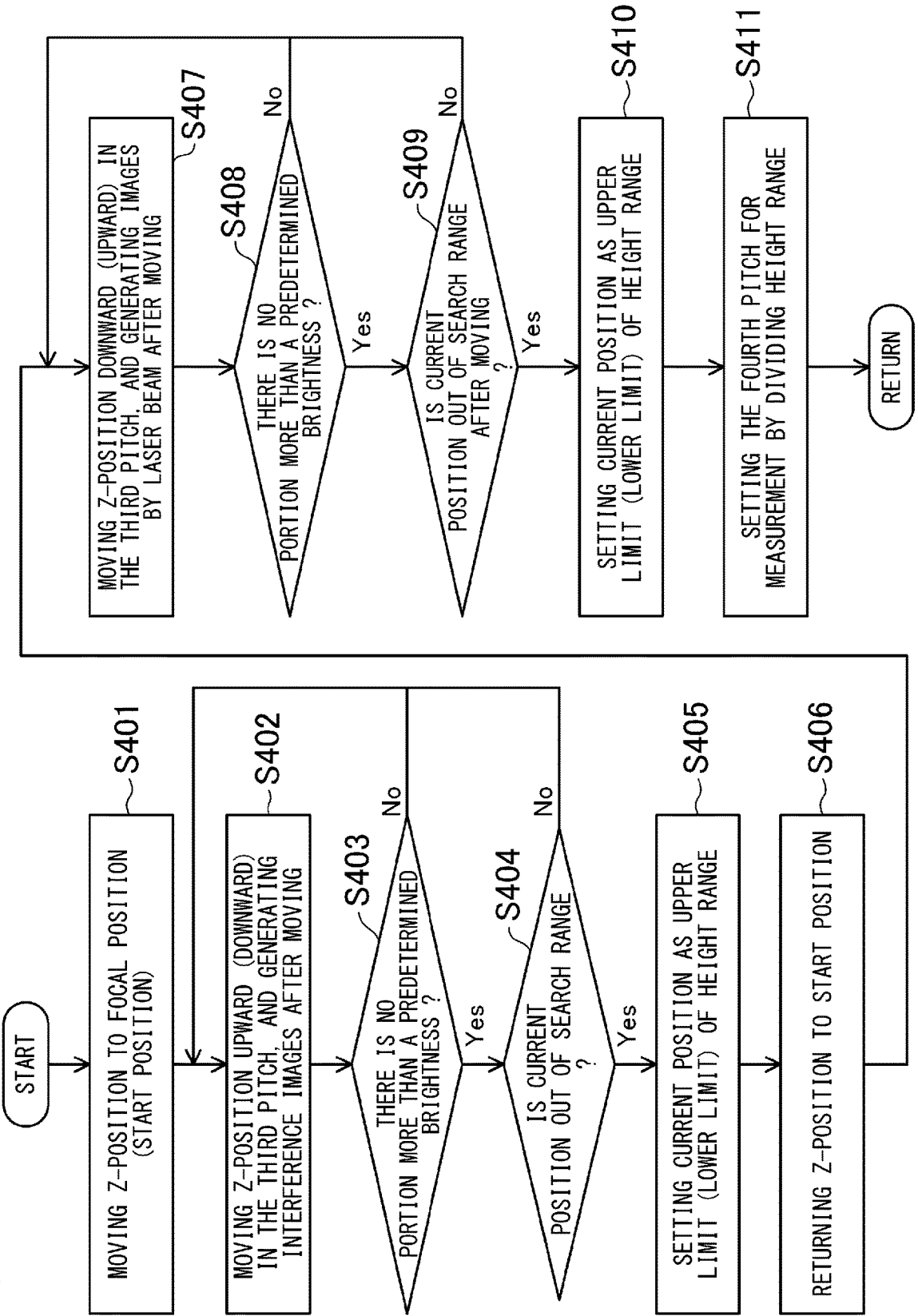
FIG. 13 is a flowchart exemplifying a height range setting procedure by using the laser confocal method.

Note that the setting of the height range using the white light interferometry is just an example. Instead of using the white light interferometry, it can be set by using the laser confocal method. In this case, instead of the flow in the example shown in FIG. 12, the flow in the example shown in FIG. 13 is performed. That is, FIG. 13 is a flowchart exemplifying the setting procedure of the height range by using the laser confocal method.

First, in Step 401 of FIG. 13, the second measurement range setting part 8j controls the Z-direction driving part 71 via the drive control part 8b, so that the relative height position (Z-position) of the stage 23 with respect to the objective lens 54 is moved to the predetermined starting position. This starting position is set in the same manner as Step S301 of FIG. 12. Here, it exemplifies as the case in which the starting position is defined as the focal position Zp.

Next, in Step S402, the Z-position of the objective lens 54 is moved upward in the predetermined third pitch from the starting position which is moved in Step S401. And, at each Z-position moved every third pitch, the second measurement range setting part 8j performs the generation of the laser images by the laser optical system 6. Further, for the plurality of pixels in the laser image generated at each Z-position (height position), the second measurement range setting part 8j generates the pixel data corresponding to the light reception signal generated by the light receiving part 66 in a pixel unit. When the peak value of the pixel data is larger than the output upper limit value, there is a possibility to saturate the pixel data at the output upper limit value (the second threshold). In other words, when there is a portion brighter than the predetermined value in the laser image, it is considered that the Z-position is inappropriate for measuring the surface shape. By searching the height range so that the pixel data is not saturated, the height range can be used for measuring the surface shape.

Specifically, in Step S403, the second measurement range setting part 8j judges whether or not the all values of the plurality of pixel data generated in Step S402 are lower than the second threshold, and when the judgement is YES (when a portion brighter than the predetermined value does not exist), it proceeds to Step S404, and on the other hand, when it is NO (when a portion brighter than the predetermined value exists), it returns to Step S402.

Next, in Step S404, the second measurement range setting part 8j judges whether or not the current Z-position is out of the predetermined search range, and when the judgement is YES, it proceeds to Step S405, and on the other hand, when it is NO, it returns to Step S402.

Next, in Step S405, the second measurement range setting part 8j sets the current Z-position as the upper limit position of the height range. And next, in Step S406, the second measurement range setting part 8j controls the Z-direction driving part 71 via the drive control part 8b, so that the Z-position is returned to the starting position (focal position Zp).

Next, in Step S407, the second measurement range setting part 8j controls the Z-direction driving part 71 via the drive control part 8b, so that from the starting position moved in Step S401, in a manner moving to the opposite direction in Step S402, the Z-position of the objective lens 54 is moved downward in the predetermined third pitch (it is moved in a manner of narrowing the distance between the stage 23 and the objective lens 54). And, at each Z-position moved every third pitch, the second measurement range setting part 8j performs the generation of the laser images by the laser optical system 6.

Next, in Step S408, the second measurement range setting part 8j performs the similar judgement as Step S403, and when the judgement is YES, it proceeds to Step S409, and on the other hand, when it is NO, it returns to Step S407.

Next, in Step S409, the second measurement range setting part 8j performs the similar judgement as Step S404, and when the judgement is YES, it proceeds to Step S410, and on the other hand, when it is NO, it returns to Step S407.

Next, in Step S410, the second measurement range setting part 8j sets the current Z-position as the lower limit position of the height range. And next, in Step S411, the second measurement range setting part 8j sets the fourth pitch for measurement by dividing the distance between the upper limit position and the lower limit position in equal intervals. As described above, the fourth pitch sets to be narrower than the first pitch for the autofocus, and the third pitch for setting the height range.

Figure 14:
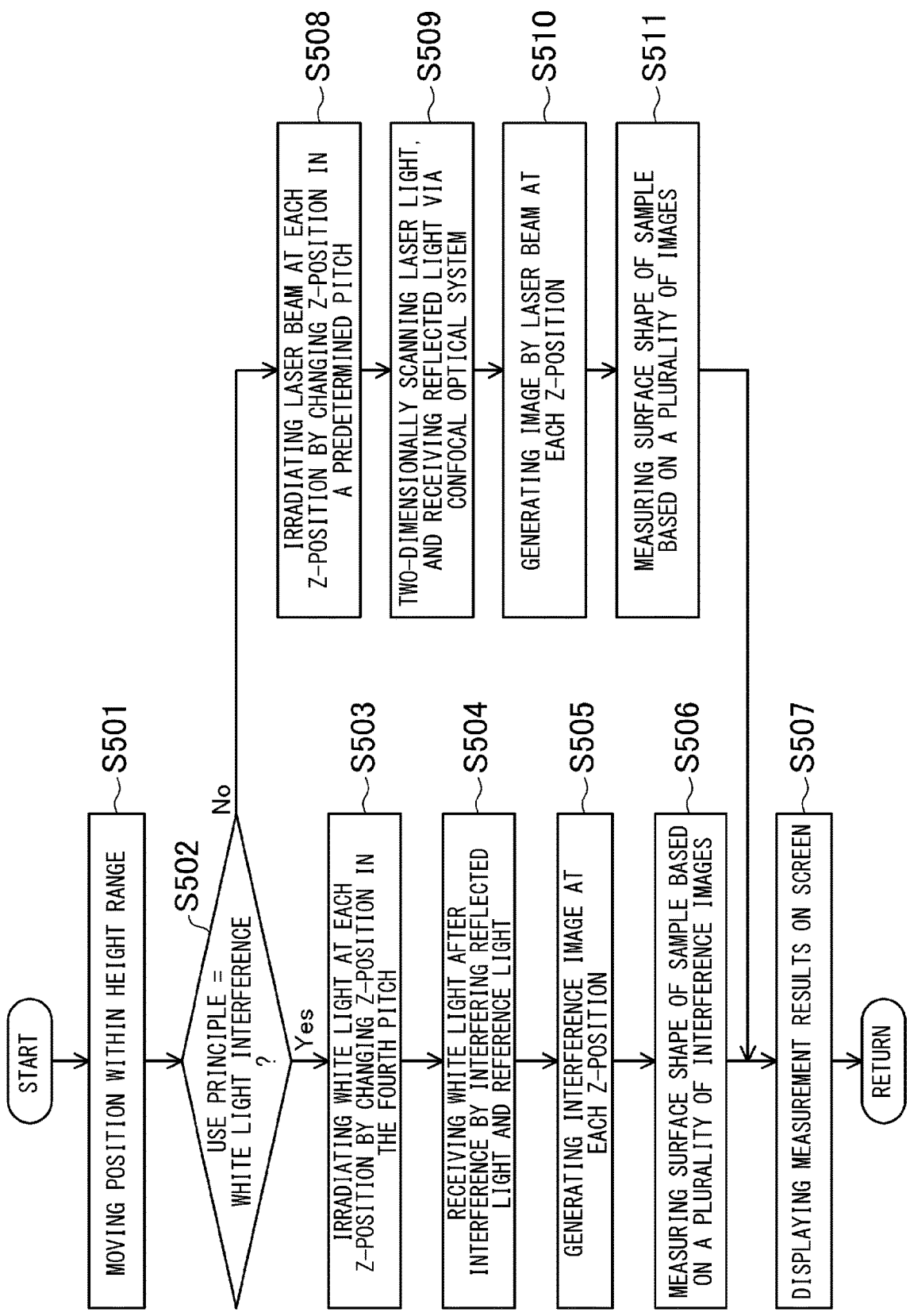
FIG. 14 is a flowchart exemplifying a surface shape measuring procedure by the white light interference microscope.

When the flow ends as shown in FIGS. 12 and 13, the control process proceeds from Step S15 to Step S16 of FIG. 9. FIG. 14 is a diagram exemplifying the concrete process performed in Step S16 of FIG. 9. That is, FIG. 14 is a flowchart exemplifying the measurement procedure of the surface shape by the white light interference microscope 1.

First, in Step S501 of FIG. 14, the drive control part 8b controls the Z-direction driving part 71, so that the relative height position (Z-position) of the stage 23 with respect to the objective lens 54 is moved within the height range set by the first or second measurement range setting part 8i, 8j.

Next, in Step S502, the unit control system 8 judges whether or not the unit control system 8 selects the white light interferometry as the user principle. Here, when it judges that the white light interferometry is selected (Step S502: YES), the control process proceeds from Step S502 to Step S503. In this case, the measurement using the white light interferometry is performed.

On the other hand, in Step S502, when it judges that the white light interferometry is not selected, and for example, the laser confocal method is selected (Step S502: NO), the control process proceeds from Step S502 to Step S508. In this case, in the example figure, the measurement using the laser confocal method is performed.

When proceeding from Step S502 to Step S503, the first measuring part 8k operates the Z-direction driving part 71 via the drive control part 8b, so that the Z-position is changed in the aforementioned fourth pitch. And, the first measuring part 8k irradiates the white light from the white light source 51 at each Z-position moved every fourth pitch.

Next, in Step S504, the interference light obtained by the interference of the reflected light and the reference light of the measurement light is irradiated on the image sensor element 58a, and a signal indicating the light receiving intensity in each pixel is inputted to the first measuring part 8k.

Next, in Step S505, based on the signal inputted in Step S504, the interference image in each Z-position is generated. In this case, as shown in FIG. 16, in the interference image, the interference fringes 51, S2, S3 are appeared. And next, in Step S506, based on the plurality of interference images in which the Z-position is differentiated, the first measuring part 8k measures the surface shape of the sample SP.

On the other hand, when proceeding from Step S502 to Step S508, the second measuring part 8l operates the Z-direction driving part 71 via the drive control part 8b, so that the Z-position is changed in the fourth pitch. And, the second measuring part 8l is configured to irradiate the laser beam from the laser light source 61 at each Z-position moved every fourth pitch.

Next, in Step S509, as described above, the laser beam is two-dimensionally scanned in each unit area, and the reflected light of the laser beam is received via the pinhole 65a configuring the confocal optical system. With this, the reflected light of the laser beam is irradiated on the photodetector 66a, and the signal indicating the light receiving intensity in each pixel is inputted to the second measuring part 8l.

Next, in Step S510, based on the signal inputted in Step S509, the laser image is generated at each Z-position. And next, in Step S511, based on the plurality of laser images in which the Z-position is differentiated, the second measuring part 8l measures the surface shape of the sample SP.

Finally, in Step S507 continued from Step S506 or Step S511, the display control part 8c controls the display part 41, so that on the display part 41, the measurement result of the surface shape by the first measuring part 8k or the second measuring part 8l is displayed.

(Regarding the Measurement Method by the Combination of the Laser Confocal Method and the White Light Interferometry)

As described above, in the white light interference microscope 1 according to the present embodiment, as the example shown in FIG. 7A, when searching the focal position Zp, the white light interferometry is not used, but the principle of the confocus by the laser beam (laser confocal method) is used. With this, without searching the focal position Zp from the state of being focused to some extent, the gain of the image sensor element 58a can be sufficiently enhanced. As a result, it is effective from the point of view of requiring labor and time, etc., and it is possible to improve the usability when focusing.

Further, as the example shown in FIG. 7A, when searching the focal position Zp using the laser confocal method, by the laser beam, the white light interference microscope 1 scans narrower range than the case in which the surface shape is measured by using the laser confocal method. Since the scanning range is narrowed, the focal position Zp can be searched in high speed. Particularly, by scanning the laser beam in line when searching the focal position Zp, the focal position Zp can be searched in high speed.

Generally, when the relative height position of the stage 23 is changed, the light receiving intensity obtained through the laser confocal method is moderately changed in comparison with the light receiving intensity obtained through the white light interferometry (particularly, the relative size of the component |Ip−Ib| caused by the interference fringes with respect to the light receiving intensity Ib caused by the flare component). In other words, the peak width of the light receiving intensity obtained through the laser confocal method becomes relatively wide in comparison with the peak width according to the white light interferometry.

Therefore, in the case in which the focal position Zp is searched by using the laser confocal method, in comparison with the case in which the surface shape is measured by using the white light interferometry, it is permitted to make wider distance of the height positions each other (a pitch in the height direction) used for the search, the measurement, etc.

Then, as the examples shown in FIGS. 6D and 7A, in the case in which the focal position Zp is searched by using the laser confocal method, the pitch of the height direction is relatively coarsely (widely) set in comparison with the case in which the surface shape is measured by using the white light interferometry. By setting in such way, the focal position Zp can be searched in high speed.

Further, as the example shown in FIG. 12, the first measurement range setting part 8i sets the height range used for the measurement of the surface shape by using the white light interferometry. When the interference fringes are not included in the interference image, the measurement light and the reference light are not interfered, so that the white light interferometry cannot be used. Thus, as the example of Step S303 shown in FIG. 12, the setting is performed based on the number of the interference fringes, so that the height range can be defined more appropriately.

Further, to begin with, as the example shown in FIG. 9, it is configured to set the height range after the focal position Zp was searched, so that the height range including the focal position Zp can be set precisely and in high speed. This is extremely effective to smoothly perform various settings of the height range, etc.

Further, the setting of the height range starts from the starting position with the focal position Zp as a reference, so that the height range can be set in the state of being focused to some extent. Accordingly, the height range can be set in high speed.

Further, as the example shown in FIG. 13, the second measurement range setting part 8j sets the height range for the measurement of the surface shape by using the laser confocal method. When the image is extremely dark, it is considered that the laser beam is not focused. Then, as the example of Step S403 shown in FIG. 13, by performing the setting based on the brightness of the image, the height range can be more appropriately defined.

Further, in the case in which the height range is set, as much as, when the surface shape is measured by using the white light interferometry, it is not necessary to precisely analyze the interference image. Therefore, it is permitted to make a wider distance (a pitch of the height direction) of the height positions each other used for the search, the measurement, etc.

Then, as the example shown in FIG. 7A, in the case in which the height range (measurement range) is set, the pitch of the height direction is relatively coarsely (widely) set in comparison with the case in which the surface shape is measured by using the white light interferometry. With such setting, the height range can be set in high speed.

Further, the height range is set from the starting position with the focal position Zp as a reference, so that the brightness can be adjusted in the state of being focused to some extent. With this, without occurring the saturation caused by the flare components, etc., the brightness can be appropriately adjusted. In this configuration, it is extremely effective from the point of view that the processing according to focusing by the laser confocal method, and the processing according to the shape measurement by the white light interferometry can be smoothly connected.

Other Embodiments

In the aforementioned embodiment, when searching the focal position Zp by the focal calculation part 8e, it is configured to scan the laser beam in line in each Z-position, but the present disclosure is not limited to such configuration. Without scanning the laser beam, it may be irradiated to only a specific portion.

Further, the configuration of various flowcharts can be appropriately changed. For example, the order of Step S1 and Step S2 of FIG. 8 may be switched, and the order of Step S2 and Step S3 may be switched, and the order of Step S14 and Step S15 of FIG. 9 may be switched.

Further, in the aforementioned embodiment, the configuration in which the branching optical system 55 is built in the interference objective lens Oc is exemplified, but the present disclosure is not limited to such configuration. Instead of the arrangement inside the interference objective lens Oc, the branching optical system 55 may be arranged inside the observation unit 2. In such arrangement, the branching optical system 55 can be configured as an optical element capable of being inserted to/removed from the light passage connecting each optical component of the observation unit 2.

In the case in which the aforementioned optical element capable of being inserted/removed is used, the optical element is inserted into the optical passage when the measurement is performed by the white light interferometry, and on the other hand, when the measurement is performed by the laser confocal method, it is removed from the optical passage. Further, regardless the timing for performing the measurement, when the white light source 51 is simply used as an illumination, the optical element can be inserted/removed according to the need such as when performing various processing using the laser beam.

What is claimed is:
1. A white light interference microscope comprising:
   a stage on which a measuring object is placed;
   a white light source that irradiates white light to the measuring object placed on the stage via an objective lens;
   a branching optical system that branches the white light irradiated from the white light source into a reference light directed to a predetermined reference surface, and a measurement light directed toward the measuring object;
   a camera that captures an interference image by receiving the reference light reflected by the reference surface and the measurement light reflected by the measuring object;
   a laser light source that irradiates a laser beam directed to the measuring object via the same objective lens or a different objective lens;
   a photodetector that receives a reflected light of the laser beam from the measuring object via a pinhole arranged in a confocal optical system including the objective lens, and generating a light reception signal according to a light receiving intensity of the reflected light;
   a driving part that adjusts a relative height position of the stage with respect to the objective lens; and a processor in communication with a memory, the processor being configured to execute instructions stored in the memory to:

calculate a focal position matching a focus of the objective lens with a surface of the measuring object based on the light reception signal generated by the photodetector with respect to receiving the reflected light of the laser beam from the measuring object via the pinhole arranged in the confocal optical system at each relative height position of the stage;

control the driving part to move the relative height position to the focal position by adjusting the relative height position of the stage; and perform a first measurement processing which measures a surface shape of the measuring object based on a plurality of interference images captured by the camera, the camera receiving the reference light reflected by the reference surface and the measurement light reflected by the measuring object, at a plurality of height positions defined within a height range including the focal position.

2. The white light interference microscope according to claim 1, further comprising:

a laser scanner scanning the laser beam irradiated from the laser light source on the surface of the measuring object in X-axis and Y-axis directions, wherein the processor is configured to perform a second measurement processing which measures the surface shape of the measuring object based on the light receiving intensity of the reflected light of the laser beam scanned within a first scanning range by controlling the laser scanner.

3. The white light interference microscope according to claim 2, wherein the processor scans the laser beam within a second scanning range by operating the laser scanner in each height position of the stage at the time of calculation of the focal position, and the second scanning range is set narrower than the first scanning range.

4. The white light interference microscope according to claim 3, wherein the second scanning range in the Y-axis direction is set shorter than the first scanning range.

5. The white light interference microscope according to claim 3, wherein when the processor calculates the focal position, a distance of the height positions from each other at the time of changing the relative height position of the stage is set wider than in the case of measuring the surface shape of the measuring object by the first measurement processing.

6. The white light interference microscope according to claim 1, wherein after the calculation of the focal position, the processor generates an interference image via the camera in a state in which the relative height position of the stage is changed from a starting position with the focal position as a reference, and calculates a peak position of interference fringes from the interference image generated at each height position, and the height range is set as a range in which a pixel number, for which the peak position is calculated, is above a predetermined first threshold.

7. The white light interference microscope according to claim 1, wherein after the calculation of the focal position, the processor generates an image based on the light reception signal in a state in which the relative height position of the stage is changed from a starting position set with the focal position as a reference, and generates pixel data corresponding to the light reception signal generated in the photodetector for a plurality of pixels in an image generated at each height position, and the height range is set in a range in which all values of the plurality of pixel data are below a predetermined second threshold.

8. The white light interference microscope according to claim 5, wherein in the case in which a distance of the height positions from each other at the time of changing the relative height position of the stage is set as the height range, the processor sets wider than in the case of measuring the surface shape of the measuring object.

9. The white light interference microscope according to claim 5, wherein the processor sets the focal position as the starting position.

10. The white light interference microscope according to claim 5, wherein the processor sets a range which is partitioned at an upper limit position set to be more than the focal position, and at a lower limit position set to be less than the focal position, and after the lower limit position is set, the upper limit position is set.

11. The white light interference microscope according to claim 10, wherein the processor divides the distance between the upper limit position and the lower limit position in an equal interval in the state in which the upper limit position and the lower limit position are set, and sets each height position of the stage when measuring the surface shape of the measuring object.

12. The white light interference microscope according to claim 1, wherein after calculating the focal position, the processor adjusts brightness of the white light source based on interference images captured by the camera, and among the interference images captured by the camera at each height position by changing the relative height position of the stage from the starting position set with the focal position as a reference by controlling the driving part, the processor extracts the interference images including the brightest pixel, and adjusts the brightness of the white light source in a range in which the brightness of each pixel in the interference images is not saturated.

13. The white light interference microscope according to claim 12, wherein the processor sets the focal position as the starting position.

* * * * *